(12) United States Patent
Miyamoto et al.

(10) Patent No.: US 7,679,623 B2
(45) Date of Patent: Mar. 16, 2010

(54) IMAGE PROCESSING PROGRAM AND IMAGE PROCESSING DEVICE

(75) Inventors: Shigeru Miyamoto, Kyoto (JP); Kenta Usui, Kyoto (JP); Kazuaki Morita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 894 days.

(21) Appl. No.: 11/482,751

(22) Filed: Jul. 10, 2006

(65) Prior Publication Data

US 2007/0171221 A1    Jul. 26, 2007

(30) Foreign Application Priority Data

Jan. 26, 2006 (JP) .............................. 2006-017715

(51) Int. Cl.
*G09G 5/00* (2006.01)
(52) U.S. Cl. ..................... 345/619; 345/419; 345/581
(58) Field of Classification Search .................. None
See application file for complete search history.

(56) References Cited

U.S. PATENT DOCUMENTS

| | | | | |
|---|---|---|---|---|
| 5,056,031 A | * | 10/1991 | Nakano et al. | 701/301 |
| 6,558,257 B1 | * | 5/2003 | Sugawara | 463/31 |
| 6,869,363 B2 | * | 3/2005 | Okitsu et al. | 463/29 |
| 7,457,444 B2 | * | 11/2008 | Geiger et al. | 382/128 |
| 2004/0063501 A1 | * | 4/2004 | Shimokawa et al. | 463/49 |
| 2006/0200314 A1 | * | 9/2006 | Ajioka et al. | 701/301 |
| 2007/0060234 A1 | * | 3/2007 | Yamada et al. | 463/8 |
| 2007/0116326 A1 | * | 5/2007 | Aonuma et al. | 382/100 |
| 2007/0167203 A1 | * | 7/2007 | Yamada et al. | 463/7 |

FOREIGN PATENT DOCUMENTS

JP     07-230559     8/1995

* cited by examiner

*Primary Examiner*—Kee M Tung
*Assistant Examiner*—Jwalant Amin
(74) *Attorney, Agent, or Firm*—Nixon & Vanderhye P.C.

(57) ABSTRACT

A computer of an image processing device executing an image processing program displays, on a display device, a virtual three-dimensional space where there are a plurality of objects. The computer varies a size of a collision detection region defined for a predetermined object so that the size repeatedly increases and decreases over time, while the predetermined object is moving. Then, based on the collision detection region, it is determined whether or not the predetermined object and another object are in contact with each other. The computer displays, on the display device, a predetermined effect being inflicted on the object determined to be in contact with the predetermined object.

10 Claims, 17 Drawing Sheets

IMAGE PROCESSING PROGRAM AND IMAGE PROCESSING DEVICE

CROSS REFERENCE TO RELATED APPLICATION

The disclosure of Japanese Patent Application No. 2006-017715 is incorporated herein by reference.

BACKGROUND AND SUMMARY

The exemplary embodiments disclosed herein relate to an image processing program and an image processing device and, more particularly, to an image processing program and an image processing device for detecting a collision between objects in a virtual three-dimensional space.

Patent Document 1 (Japanese Laid-Open Patent Publication No. 7-230559) describes a conventional technique for performing a collision detection (also called "contact detection") between objects in a video game where there are a plurality of objects (a player character, etc.) in a virtual three-dimensional space. This technique uses a plurality of spherical regions as regions defined for each object for the purpose of collision detection ("collision detection regions"). Specifically, an image processing device described in Patent Document 1 defines a plurality of spherical regions in each object, and calculates the degree of overlap between spherical regions of different objects using the center coordinates and the radii of the spheres. If the degree of overlap is greater than a predetermined value, it is determined that the objects have contacted each other. Thus, a collision detection can be performed by approximating each object by a plurality of spheres. Then, the amount of memory required for the collision detection can be reduced as compared with a case where each object is approximated by a quadrangular prism, whereby it is possible to increase the process speed and the accuracy of the collision detection.

In this conventional technique, the collision detection regions defined for each object have the same size. Therefore, with the conventional technique, the action to be executed upon collision between objects may not be rendered naturally (realistically). FIG. 17 shows an exemplary image of the virtual space displayed by using a conventional technique. In the example shown in FIG. 17, a tornado moves across the ground with a large number of fallen leaves 111. In this example, a collision detection region is defined for each fallen leaf 111 and the tornado, and a collision detection is performed between the fallen leaves 111 and the tornado. If the tornado contacts a fallen leaf 111, the process shows the fallen leaf 111 being swirled up by the tornado. Where the size of the collision detection region of the tornado is constant, the tornado swirls up the fallen leaves 111 on a path of a constant width equal to that of the collision detection region of the tornado. Therefore, after the tornado passes, the fallen leaves 111 along the band-shaped region A2 (see FIG. 18) of a constant width will be all blown away. However, it is unrealistic and seems unnatural to have all the fallen leaves 111 blown away from only the region of the constant width with the rest of the fallen leaves 111 all staying unblown. Thus, with the conventional technique, the action to be executed upon collision between objects may not be rendered naturally.

Therefore, a feature of certain exemplary embodiments is to provide an image processing program and an image processing device capable of controlling objects so that the action to be executed upon collision between objects is rendered more naturally.

The certain exemplary embodiments have the following features. Note that parenthetic expressions in the following section (reference numerals, supplementary explanations, etc.) are merely to indicate the correlation between what is described in the following section and what is described in the detailed description set out further below in the present specification, and are in no way intended to restrict the scope of the certain exemplary embodiments described herein.

A first aspect of certain exemplary embodiments is directed to a computer-readable storage medium storing an image processing program (the video game program 80) to be executed by a computer (the CPU 31) of an image processing device (the video game device 3) for displaying, on a display device (the TV 2), a virtual three-dimensional space where there are a plurality of objects (e.g., the tornado object 72 and the fallen leaf objects 73) each having a collision detection region defined therefor. The image processing program instructs the computer to perform a size-varying step (step S5), a collision detection step (step S6), and a display control step (step S9). In the size-varying step, the computer varies a size of the collision detection region (75) defined for a predetermined object (the tornado object 72) so that the size repeatedly increases and decreases over time, while the predetermined object is moving. In the collision detection step, the computer determines whether or not the predetermined object is being in contact with another object (the fallen leaf object 73) using the collision detection regions (75 and 76) thereof. In the display control step, the computer displays, on the display device, a predetermined effect (e.g., an object being blown away) being inflicted on the object determined to be in contact with the predetermined object.

In a second aspect of certain exemplary embodiments, a preliminary detection region (77), different from the collision detection region, may be defined for the predetermined object. The image processing program instructs the computer to further perform a preliminary detection step (steps S3 and S4). In the preliminary detection step, the computer determines whether or not the collision detection region defined for the other object and the preliminary detection region are in contact with each other. The size-varying step and the collision detection step are performed only when it is determined in the preliminary detection step that the collision detection region defined for the other object and the preliminary detection region are in contact with each other.

In a third aspect of certain exemplary embodiments, in the size-varying step, the computer may vary the size of the collision detection region with a predetermined time interval (e.g., once per frame).

In a fourth aspect of certain exemplary embodiments, in the size-varying step, the computer may vary the size of the collision detection region randomly within a predetermined range.

In a fifth aspect of certain exemplary embodiments, in the display control step, the computer may show a movement of the object determined to be in contact with the predetermined object to a position where the object is no longer in contact with the predetermined object, or the computer may change an appearance of the object.

The certain exemplary embodiments may be provided in the form of an image processing device capable of realizing similar functions to those realized by executing the image processing program as set forth above.

According to the first aspect, the collision detection region is varied in the size-varying step while the predetermined object is moving. Then, even if the predetermined object moves along a smooth path, the periphery of the area across which other objects are determined to be in contact with the predetermined object will be in an irregular shape, but not a smooth shape conforming to the path of the predetermined object. This prevents the periphery of the area from being unnaturally regular. Thus, it is possible to more naturally render an action to be executed upon collision.

According to the second aspect, the preliminary detection region is defined for the predetermined object, wherein the size of the collision detection region of the predetermined object is determined and the collision detection process is performed only when the preliminary detection region is in contact with the collision detection region of another object. Therefore, when it is not necessary to perform the process of determining the size of the collision detection region (e.g., when there is no other objects around the predetermined object), the process can be omitted, thereby reducing the processing load on the computer.

According to the third aspect, the size of the collision detection region is varied with a predetermined time interval. Then, it is no longer necessary to define a preliminary detection region, as in the second aspect, whereby it is possible to reduce the memory size, which needs to be provided in the image processing device.

According to the fourth aspect, the size of the collision detection region is varied randomly. Then, as compared with a case where it is varied with some regularity, it is possible to more naturally render an action to be executed upon collision.

According to the fifth aspect, the computer moves the other object determined to be in contact with the predetermined object (e.g., as if it were blown away as in the exemplary embodiment to be described below), or the computer changes the appearance of the other object (e.g., changes its shape as in the variation to be described below). Thus, it is possible to express the difference in the game space between the state of the area in contact with the predetermined object and that of the area not in contact with the predetermined object, in a manner readily understandable to the user.

These and other features, aspects and advantages of the certain exemplary embodiments described herein will become more apparent from the following detailed description when taken in conjunction with the accompanying drawings.

DETAILED DESCRIPTION

Figure 1:
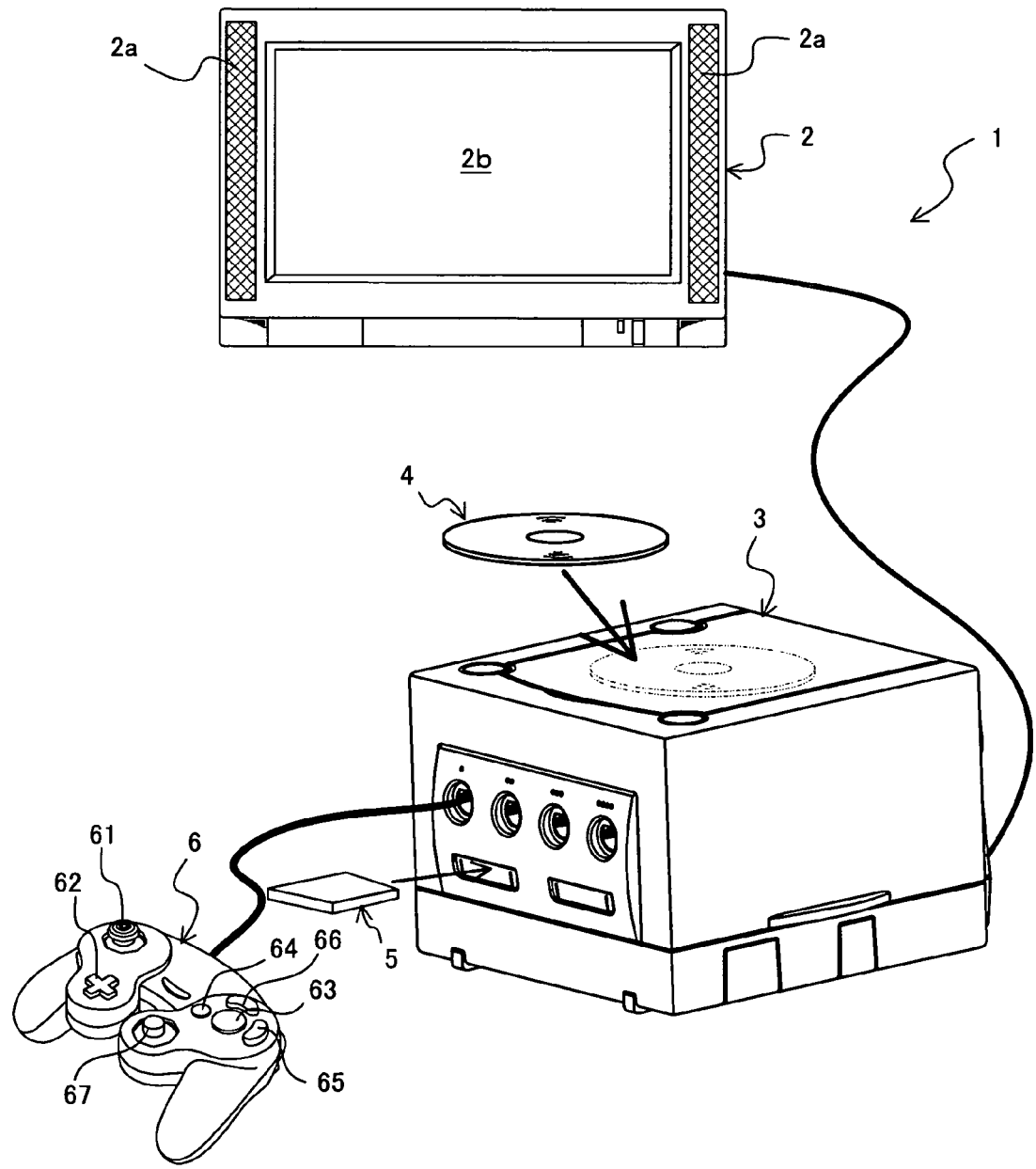
FIG. 1 shows an external view of a video game system 1.

A video game device, being an example of an image processing device according to a certain exemplary embodiment, and a video game system including the video game device will now be described. FIG. 1 shows an external view of a video game system 1. While a home-console type video game device will be described below as an example of an image processing device according to certain exemplary embodiments, the image processing device of the exemplary embodiments described herein is not limited thereto. For example, the certain exemplary embodiments described herein can be used with any type of device that includes a computer therein for executing a video game program (the image processing program), such as a portable video game device, an arcade video game device, a PDA, a mobile phone or a personal computer.

Referring to FIG. 1, the video game system 1 includes a home-console type video game device (hereinafter referred to simply as a "video game device") 3, a television receiving set (hereinafter referred to simply as a "TV") 2 being an example of a display device to be connected to the video game device 3 via a connection cable. A controller 6 including a plurality of control switches that can be operated by the player is connected to the video game device 3. The video game device 3 can receive an optical disc 4 being an example of an information storage medium storing a video game program of the present exemplary embodiment. The video game device 3 can also receive a cartridge 5 including a flash memory, or the like, for storing save data of a game, or the like. The video game device 3 displays, on the TV 2, a game image obtained by executing a video game program stored in the optical disc 4. Using the save data stored in the cartridge 5, the video game device 3 can allow the player to resume a game that was played and saved in the past, or can reproduce a past game status to obtain a game image for that past game status, and display the obtained game image on the TV 2. Then, the player of the video game device 3 can enjoy the game by operating the controller 6 while watching the game image displayed on the TV 2.

As described above, the controller 6 is detachably connected to the video game device 3 via a connection cable. The controller 6 is means for controlling primarily a player object (an object (character) to be controlled by the player) in the game space displayed on the TV 2, and includes an input section including control buttons, keys, sticks, etc., as the plurality of control switches. Specifically, the controller 6 includes a grip section to be held by the player. The controller 6 includes a main stick 61 and a cross-shaped key 62 that can be operated by the player's left thumb, for example, and a C stick 67, an A button 63, etc., that can be operated by the player's right thumb, for example. The controller 6 also includes a B button 64, an X button 65, a Y button 66 and a start-pause button. The controller 6 further includes an R button and a Z button that can be operated by the player's right index finger, for example, and an L button that can be operated by the player's left index finger. In the video game system 1, a game can be played by a plurality of players at the same time by connecting a plurality of controllers 6 to the video game device 3.

Figure 2:
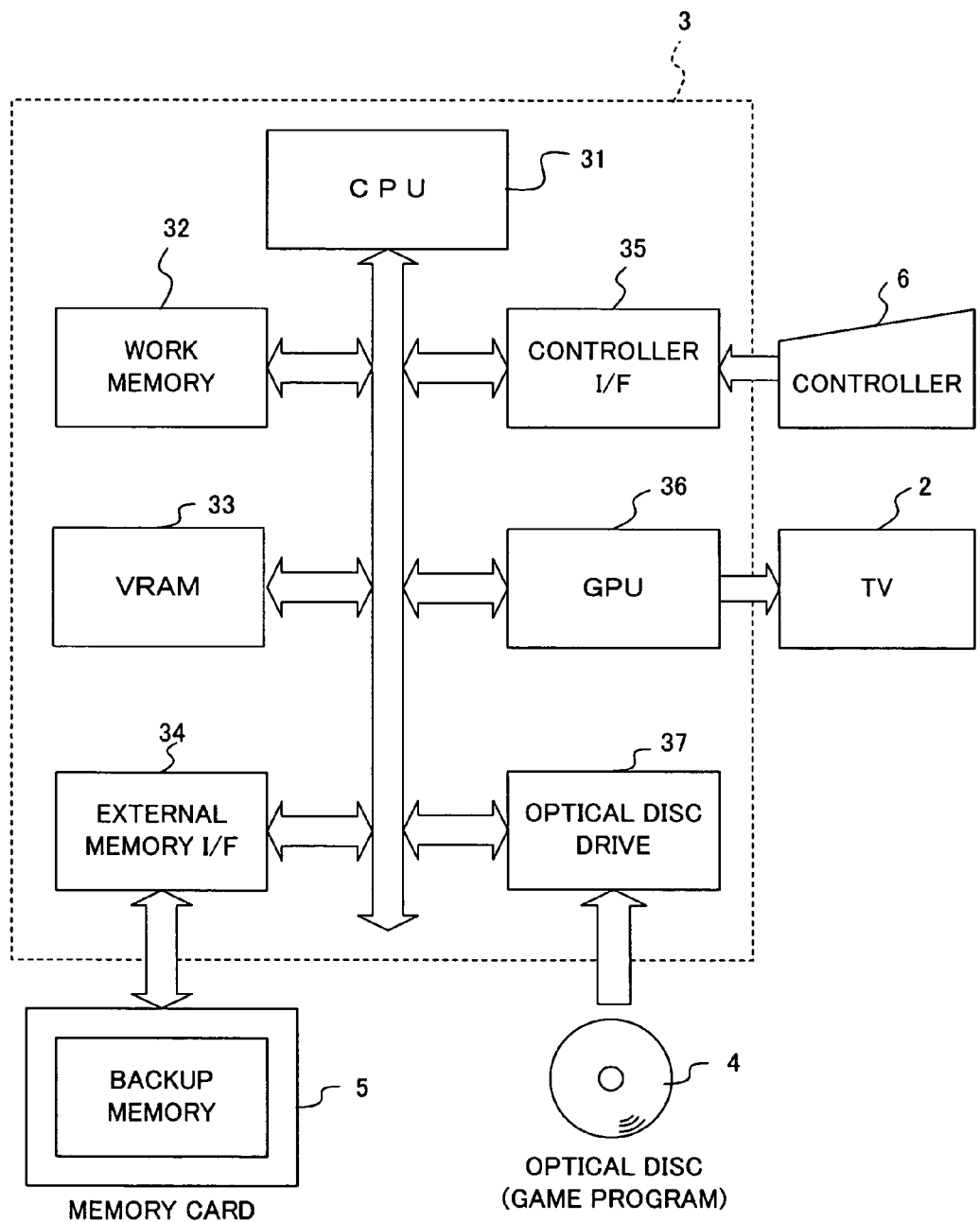
FIG. 2 shows a functional block diagram of the video game system 1.

Referring now to FIG. 2, a configuration of the video game device 3 of certain exemplary embodiments will be described. FIG. 2 shows a functional block diagram of the video game system 1. Referring to FIG. 2, the video game device 3 includes a CPU (Central Processing Unit) 31 for executing various programs. The CPU 31 executes a boot program stored in a boot ROM (not shown), thus initializing memory devices, such as a work memory 32. Then, the CPU 31 loads a video game program from the optical disc 4 to the work memory 32, and executes the video game program to perform a game process according to the video game program. In other exemplary embodiments, the video game program may be obtained from outside the video game device 3 via a communications network. The work memory 32, a video RAM (VRAM) 33, an external memory interface (I/F) 34, a controller interface (I/F) 35, a GPU (Graphics Processing Unit) 36 and an optical disc drive 37 are connected to the CPU 31 via a bus.

The work memory 32 is a storage area used by the CPU 31, and stores, as necessary, a video game program, etc., needed for the process performed by the CPU 31. For example, the work memory 32 stores a video game program, various data, etc., read out from the optical disc 4 by the CPU 31. The video game program, the various data, etc., stored in the work memory 32 are executed or otherwise used by the CPU 31. The VRAM 33 stores game image data used for displaying a game image on the TV 2. The external memory I/F 34 includes a connector (not shown) into which the cartridge 5 is plugged for communicable connection between the video game device 3 and the cartridge 5. The CPU 31 accesses a backup memory provided in the cartridge 5 via the external memory I/F 34. The controller I/F 35 includes a connector (not shown) via which an external unit and the video game device 3 are communicably connected together. For example, the controller 6 is connected to the connector via a connection cable so as to be connected to the video game device 3 via the controller I/F 35. In response to the player moving the main stick 61 or the C stick 67 or pressing the control buttons 62 to 66, etc., the controller 6 outputs control data, representing the player's operation on the controller 6, to the video game device 3. The GPU 36 includes a semiconductor chip for performing a vector calculation operation, a rendering operation, etc., needed for displaying 3D graphics, in response to an instruction from the CPU 31. The game image rendered by the GPU 36 is displayed on the TV 2. In response to an instruction from the CPU 31, the optical disc drive 37 reads out various data, such as a video game program, image data and sound data stored in the optical disc 4.

The game process to be performed by the video game device 3 according to the video game program stored in the optical disc 4 will now be described. First, the game of the present exemplary embodiment will be outlined. The present game is an action game where there are a plurality of objects in a three-dimensional virtual game space. In this game, there are a player object controlled by the player, enemy objects controlled by the video game device 3, etc. In the game space of this game, there are also fallen leaf objects (also referred to simply as "fallen leaves") on the ground and a tornado object (also referred to simply as a "tornado") caused by the player object, for example. During the game process, the video game device 3 performs a collision detection, i.e., determines whether or not there is a collision between these objects. As an example, the operation of detecting a collision between fallen leaves and a tornado will now be described.

Figure 3:
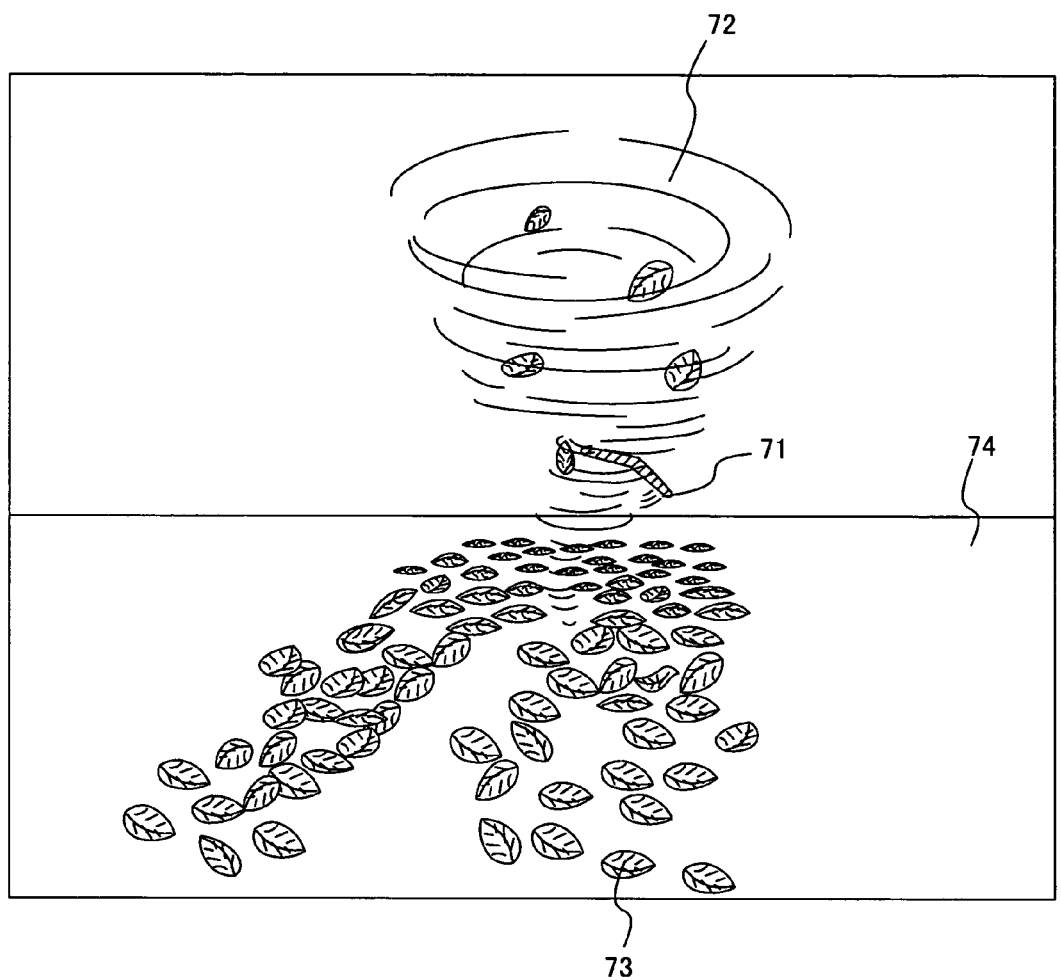
FIG. 3 shows an exemplary game screen displayed on a TV 2 by a video game device 3.

FIG. 3 shows an exemplary game screen displayed on the TV 2 by the video game device 3. The game screen shown in FIG. 3 shows a tornado 72 being caused by the player object (not shown) using a magic boomerang 71. The tornado 72 moves across a ground 74 (together with the boomerang 71 in this example). Then, fallen leaves 73 along the path of the tornado 72 on the ground are swirled up and blown away by the tornado 72. As a result, the trace of the tornado 72 is left behind along the path of the tornado 72 where the fallen leaves 73 are blown away. Note that FIG. 3 shows a game screen in a case where the tornado 72 is moving away from the viewer of the screen.

The collision detection between the tornado 72 and the fallen leaf 73 is performed based on the collision detection region defined for each object. In other words, when two collision detection regions are in contact with each other, the video game device 3 determines that the corresponding objects are in contact with each other. For example, if it is determined that the tornado 72 and a fallen leaf 73 have contacted each other, the video game device 3 moves the fallen leaf 73 as if it were being swirled up by the tornado 72. In the present exemplary embodiment, a cylindrical collision detection region is defined for each object in the game space. The cylindrical collision detection region is oriented so that the central axis thereof extends vertical to the ground plane. According to certain exemplary embodiments, the shape of the collision detection region is not limited to any particular shape, and may be a sphere or a quadrangular prism, for example.

Figure 4:
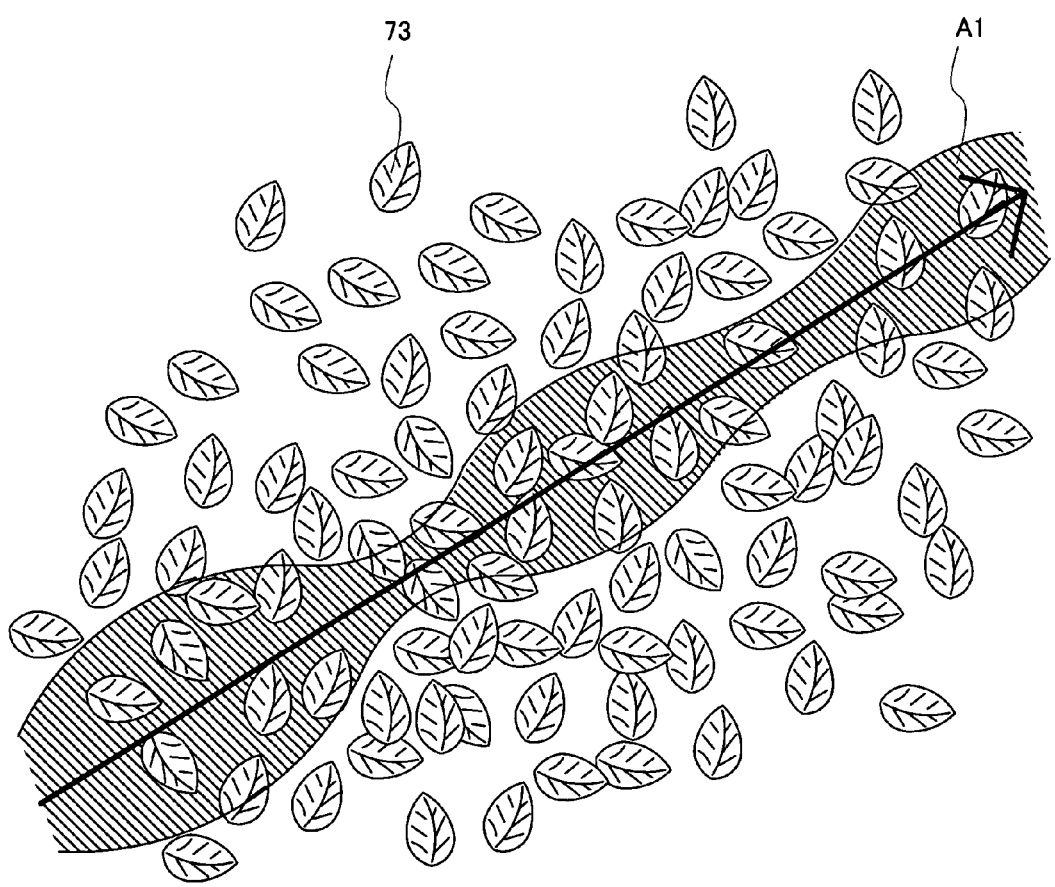
FIG. 4 shows the ground of FIG. 3 as viewed from above.
Figure 5:
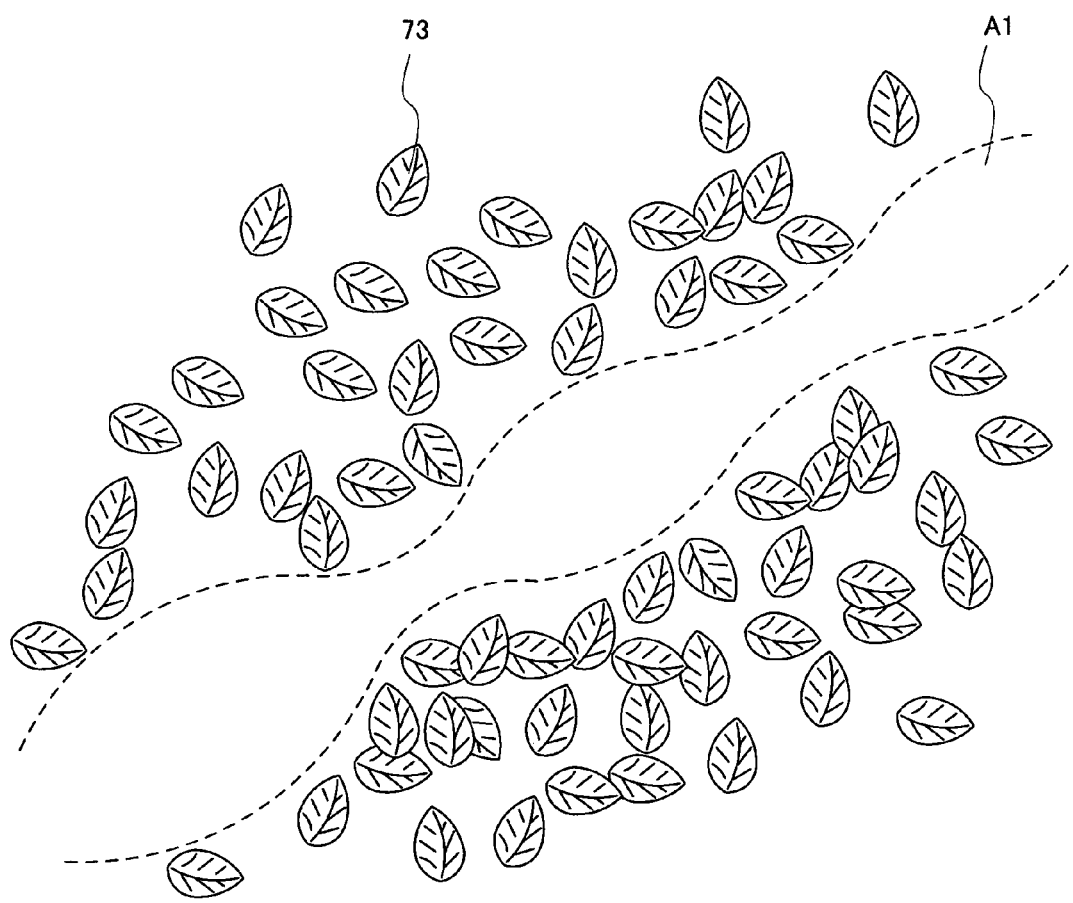
FIG. 5 shows a ground 74 after a tornado 72 has passed.
Figure 17:
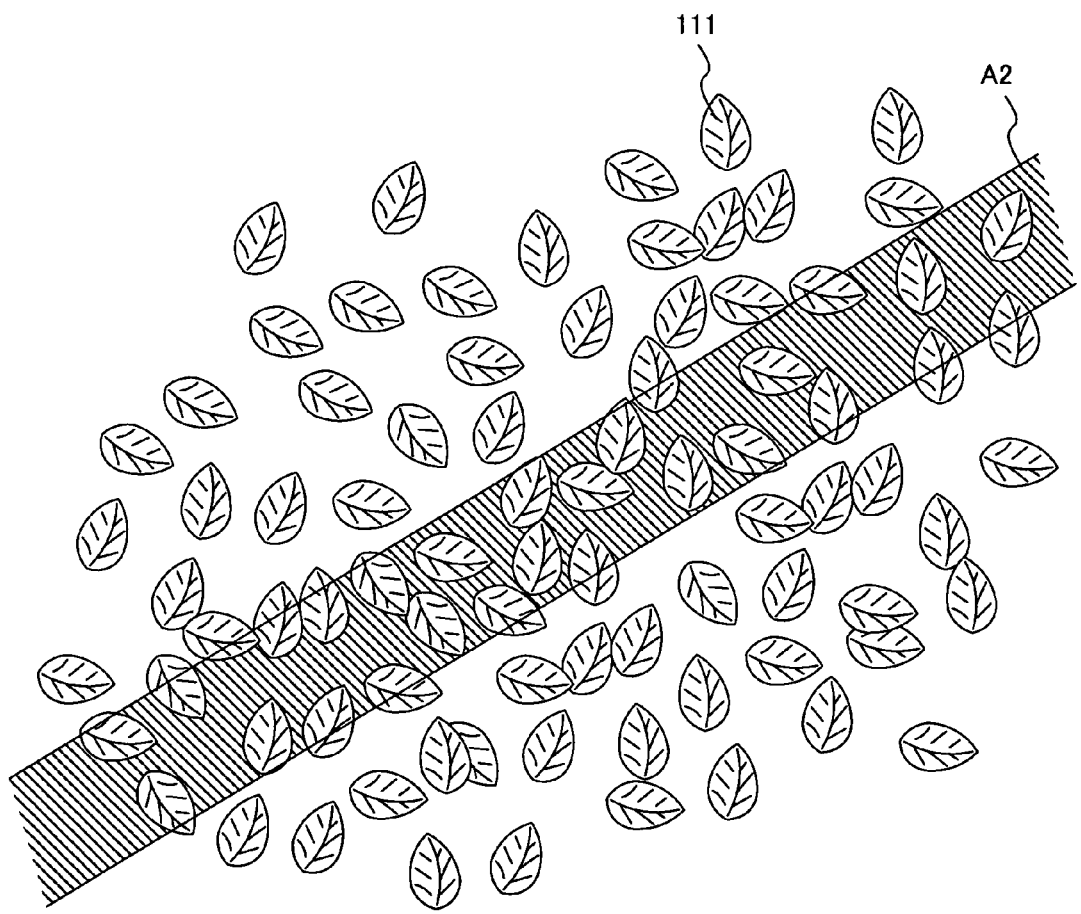
FIG. 17 shows an exemplary image of a virtual space displayed by a conventional technique.
Figure 18:
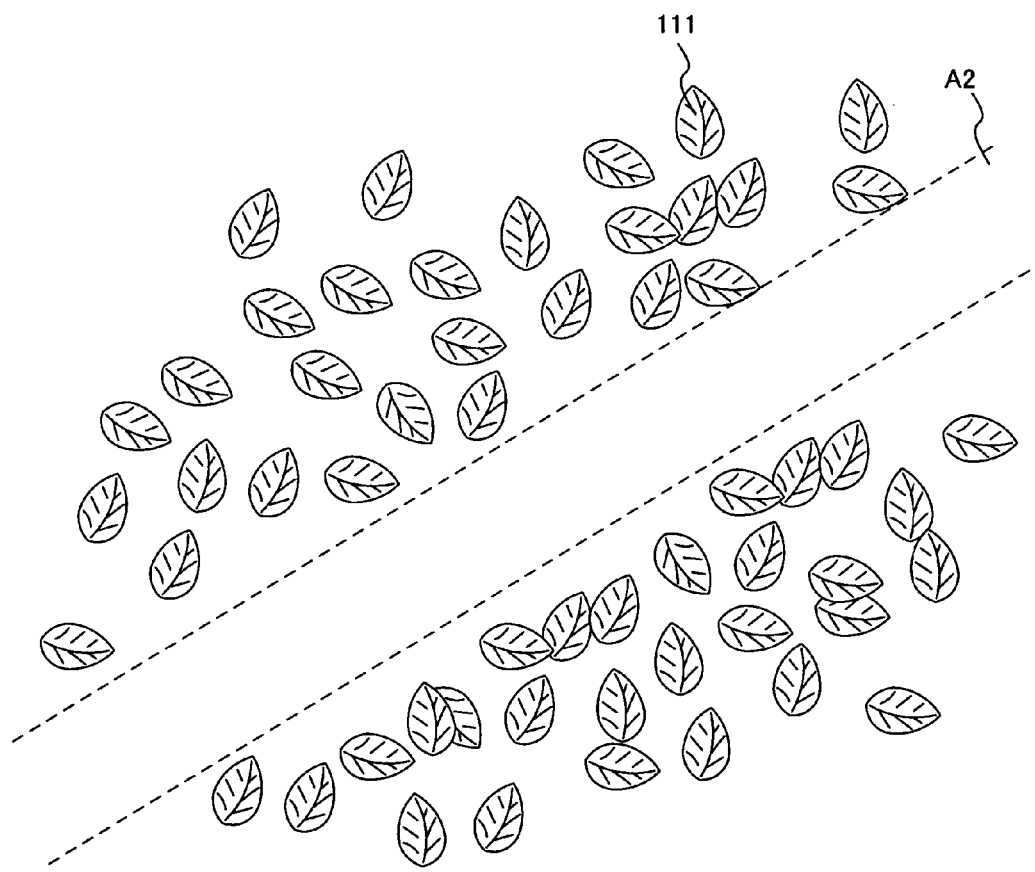
FIG. 18 shows another exemplary image of the virtual space displayed by the conventional technique.

Referring now to FIGS. 4 and 5, how the fallen leaves 73 are blown away by the tornado 72 will be described in detail. FIG. 4 shows the ground of FIG. 3 as viewed from above. The arrow shown in FIG. 4 represents the path of the center of the tornado 72 (and the collision detection region thereof). Thus, the tornado 72 moves along the arrow shown in FIG. 4. Moreover, FIG. 4 shows a region A1 where the fallen leaves 73 are blown away as the tornado 72 passes. As shown in FIG. 4, the width of the region A1 is not constant in the present exemplary embodiment. The video game device 3 varies the size (specifically, the radius of the cylinder) of the collision detection region of the tornado 72 so that the width of the region A1 is varied while the tornado 72 moves. The fallen leaves 73 on the region A1 are blown away by the tornado 72. FIG. 5 shows the ground 74 after the tornado 72 has passed. As shown in FIG. 5, the region A1, where the fallen leaves 73 have been blown away, has varied widths along its length. Thus, in the example of FIG. 5, as compared with a case where the region across which the fallen leaves 73 are blown away has a constant width (see FIG. 17), how the fallen leaves 73 lie after the tornado 72 has passed seems more realistic and more natural.

Figure 6:
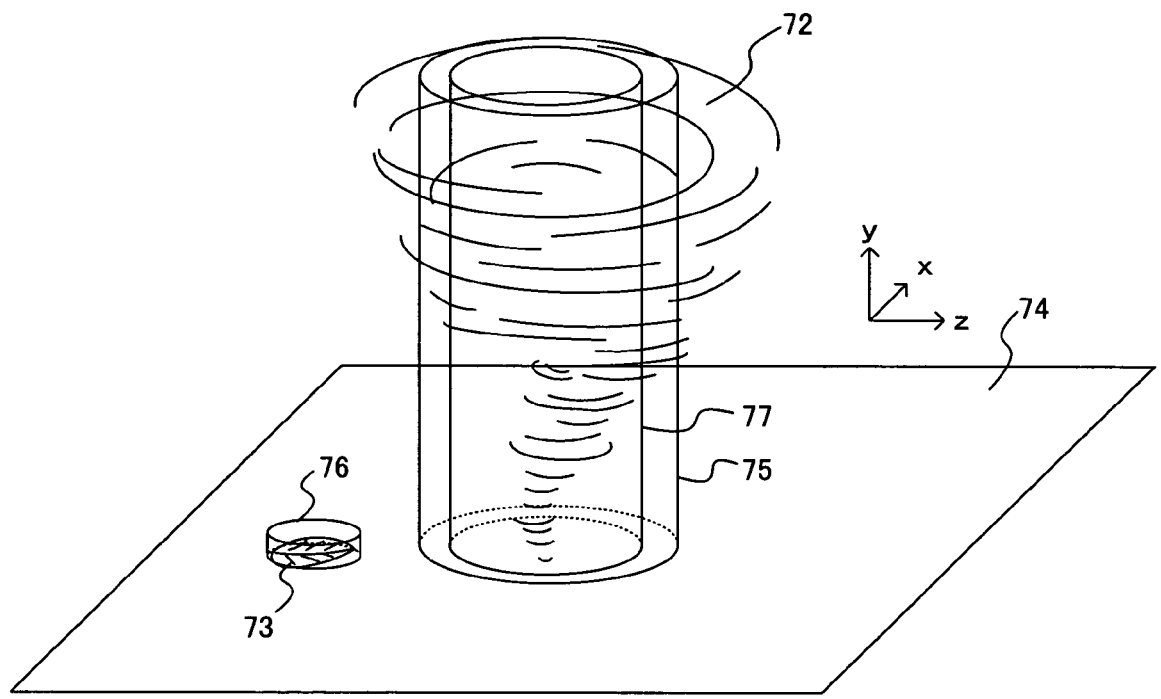
FIG. 6 shows a collision detection region defined for the tornado 72 and that defined for a fallen leaf 73.
Figure 7:
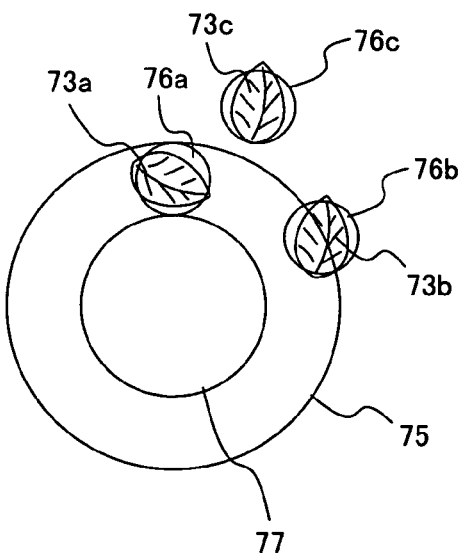
FIG. 7 shows how a collision detection process is performed.

Referring now to FIGS. 6 and 7, the collision detection process between the tornado 72 and a fallen leaf 73 will be outlined. FIG. 6 shows a collision detection region 75 defined for the tornado 72 and another collision detection region 76 defined for the fallen leaf 73. The position of a collision detection region is determined based on the position of the corresponding object, and the collision detection region is moved as the object moves. In the present exemplary embodiment, the world coordinate system (the xyz coordinate system) for specifying a position in the game space is defined so that the xz plane is parallel to the ground 74. The collision detection regions 75 and 76 are each defined so that the central axis thereof is parallel to the y axis. In the present exemplary embodiment, each collision detection region is defined virtually for the corresponding object. In other words, a collision detection region is not a set of polygons arranged in the game space, and is not displayed on the TV 2.

A cylindrical preliminary detection region 77 is also defined for the tornado 72. The preliminary detection region 77 is a region used for determining whether or not to perform a collision detection using the collision detection region 75. Thus, the video game device 3 determines whether or not the collision detection region 75 of the tornado 72 and the collision detection region of another object have contacted each other only after it is determined that the preliminary detection region 77 of the tornado 72 has contacted the collision detection region of the other object. The size of the preliminary detection region 77 is constant. As described above, the collision detection region 75 is a region of a variable size used for determining whether or not a fallen leaf should be blown away, whereas the preliminary detection region 77 is a region of an invariable size used for determining whether or not to perform the collision detection. Although the radius of the collision detection region 75 is shown in FIG. 6 to be greater than that of the preliminary detection region 77, the radius of the collision detection region 75 may become greater than, or equal to, that of the preliminary detection region 77 as the radius of collision detection region 75 is varied. As with each collision detection region, the preliminary detection region 77 is defined so that the central axis thereof is parallel to the y axis. The position of the preliminary detection region 77 is determined based on the position of the corresponding object (the tornado 72), and the preliminary detection region 77 is moved as the object moves. As with collision detection regions, the preliminary detection region 77 is defined virtually for the corresponding object, and is not displayed on the screen.

FIG. 7 shows how a collision detection process is performed. As an example, a collision detection between three fallen leaves 73a to 73c and a tornado (not shown in FIG. 7) will be described. Referring to FIG. 7, collision detection regions 76a to 76c are defined for the fallen leaves 73a to 73c, respectively. FIG. 7 shows the ground 74 as viewed from above in the virtual game space (i.e., as viewed from the positive-to-negative direction along the y axis).

Where there is a tornado 72 in the game space, the video game device 3 first determines whether or not the preliminary detection region 77 of the tornado 72 is in contact with any of the collision detection regions 76a to 76c of the fallen leaves 73a to 73c. In the example shown in FIG. 7, it is determined that the preliminary detection region 77 and the collision detection region 76a of the fallen leaf 73a are in contact with each other. If it is determined that the preliminary detection region 77 and at least one collision detection region are in contact with each other, the video game device 3 determines the radius of the collision detection region 75 of the tornado 72. In the present exemplary embodiment, the radius of the collision detection region 75 is varied so as to repeatedly increase and decrease over time. The height of the collision detection region 75 is predetermined. Once the size of the collision detection region 75 is determined, the video game device 3 determines whether or not the collision detection region 75 is in contact with any of the collision detection regions 76a to 76c. In the example shown in FIG. 7, it is determined that the collision detection region 75 is in contact with the collision detection regions 76a and 76b of the fallen leaves 73a and 73b, whereby the video game device 3 determines that the tornado 72 is in contact with the fallen leaves 73a and 73b. As a result, the fallen leaves 73a and 73b are blown away by the tornado 72. The video game device 3 iterates the detection process as described above once per a predetermined period of time (e.g., once per frame). Since the size of the collision detection region 75 is varied over time, the size of the collision detection region 75 in each iteration is different from that in the previous iteration. Therefore, the width of the region across which the collision detection region 75 passes as the tornado 72 is not constant, as shown in FIG. 4. As a result, it is possible to more realistically render how the fallen leaves 73 lie after the tornado 72 has passed.

Figure 8:
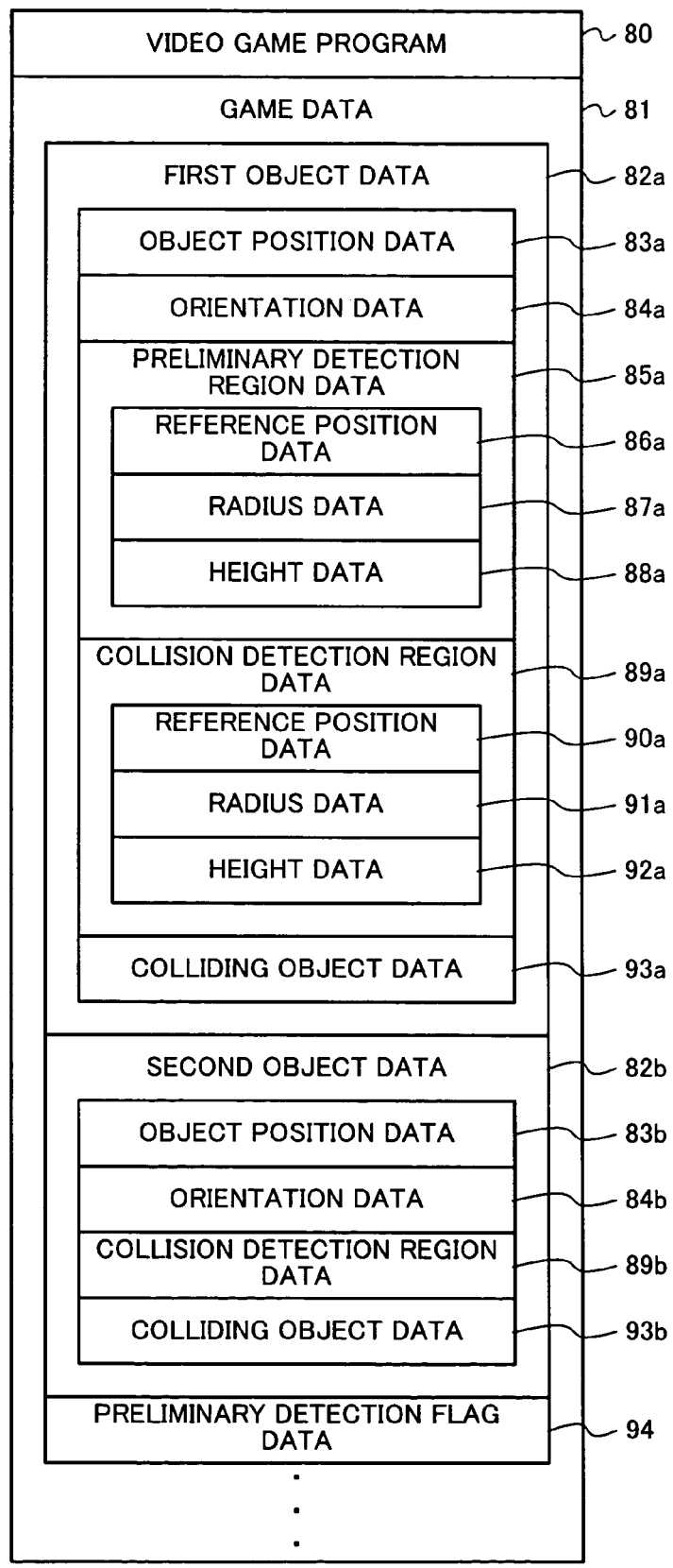
FIG. 8 shows important data stored in a work memory 32 of the video game device 3.

The details of the game process performed by the video game device 3 will now be described. First, important data to be used in the game process will be described with reference to FIG. 8. FIG. 8 shows important data to be stored in the work memory 32 of the video game device 3. As shown in FIG. 8, the work memory 32 stores a video game program 80 and game data 81. The video game program 80 is a video game program for instructing the video game device 3 to perform the game process (see FIG. 9) to be described later.

The game data 81 includes first and second object data 82a and 82b, preliminary detection flag data 94, etc. In the present exemplary embodiment, the first object data 82a is data regarding an object for which the preliminary detection region is defined, i.e., data regarding the tornado object 72, whereas the second object data 82b is data regarding an object for which the preliminary detection region is not defined, i.e., data regarding the fallen leaf object 73. Although FIG. 8 shows data of only two objects (i.e., the first object data 82a and the second object data 82b), the work memory 32 stores data of all objects to be present in the game space. The second object data 82b is data of one fallen leaf. Where there are a plurality of fallen leaves, object data similar to the second object data 82b is stored for each fallen leaf. In addition to those shown in FIG. 8, the work memory 32 also stores other data necessary for the game process, such as image data of different objects (the tornado, the fallen leaves, the player object, the enemy objects, etc.), and game space data (e.g., the terrain data).

The first object data 82a includes object position data 83a, orientation data 84a, preliminary detection region data 85a, collision detection region data 89a and colliding object data 93a. The object position data 83a represents the position of the first object in the game space. The position is represented by three-dimensional coordinate values in the world coordinate system. The orientation data 84a represents the orientation (direction) of the first object in the game space. The orientation is represented by a three-dimensional vector, which defines a direction in the game space.

The preliminary detection region data 85a represents information regarding the preliminary detection region defined for the first object. Specifically, the preliminary detection region data 85a includes reference position data 86a, radius data 87a and height data 88a. The reference position data 86a represents the position at which the preliminary detection region should be defined. In the illustrated example, the reference position data 86a represents the central position of the bottom surface of the cylindrical preliminary detection region. The central position may be represented by three-dimensional coordinate values in a coordinate system based on the first object, i.e., a coordinate system (the character coordinate system) for specifying a relative position with respect to the position of the first object with a predetermined position of the first object being the origin, or may be represented by coordinate values in the world coordinate system. The radius data 87a represents the radius of the cylindrical preliminary detection region. The height data 88a represents the height of the cylindrical preliminary detection region. Since the radius and the height of the preliminary detection region are of constant values, predetermined values are stored in the radius data 87a and the height data 88a.

The collision detection region data 89a represents information regarding the collision detection region defined for the first object. Specifically, the collision detection region data 89a includes reference position data 90a, radius data 91a and height data 92a. The reference position data 90a represents the position at which the collision detection region should be defined with respect to the position of the first object. Specifically, the reference position data 90a represents the central position of the bottom surface of the cylindrical collision detection region. The central position may be represented by coordinate values in the character coordinate system or by coordinate values in the world coordinate system. The radius data 91a represents the radius of the cylindrical collision detection region. Since the radius of the collision detection region is variable, the radius data 91a is updated by the CPU 31 as necessary during the game process. The height data 92a represents the height of the cylindrical collision detection region. Since the height of the collision detection region is of a constant value, a predetermined value is stored in the height data 92a.

The colliding object data 93a represents an object being in contact with the first object. Specifically, if an object is being in contact with the first object, the colliding object data 93a represents the object. If no object is being in contact with the first object, the colliding object data 93a represents the status where there is no object being in contact with the first object. The colliding object data 93a is updated by the CPU 31 as necessary during the game process.

The second object data 82b includes object position data 83b, orientation data 84b, collision detection region data 89b and colliding object data 93b. The object position data 83b represents the position of a second object in the game space. The position is represented by three-dimensional coordinate values in the world coordinate system. The orientation data 84b represents the orientation (direction) of the second object in the game space. The orientation is represented by a three-dimensional vector, which defines a direction in the game space. The collision detection region data 89b represents information regarding the collision detection region defined for the second object. Although not shown, the collision detection region data 89b includes reference position data, radius data and height data, as does the collision detection region data 89a. The colliding object data 93b represents another object being in contact with the second object, as does the colliding object data 93a for the first object.

The preliminary detection flag data 94 represents the value of a preliminary detection flag. The preliminary detection flag represents the result of the preliminary detection process to be described later. Specifically, if it is determined in the preliminary detection process that there is any collision detection region being in contact with the preliminary detection region, the preliminary detection flag is set to "1". Otherwise, the preliminary detection flag is set to "0".

Figure 9:
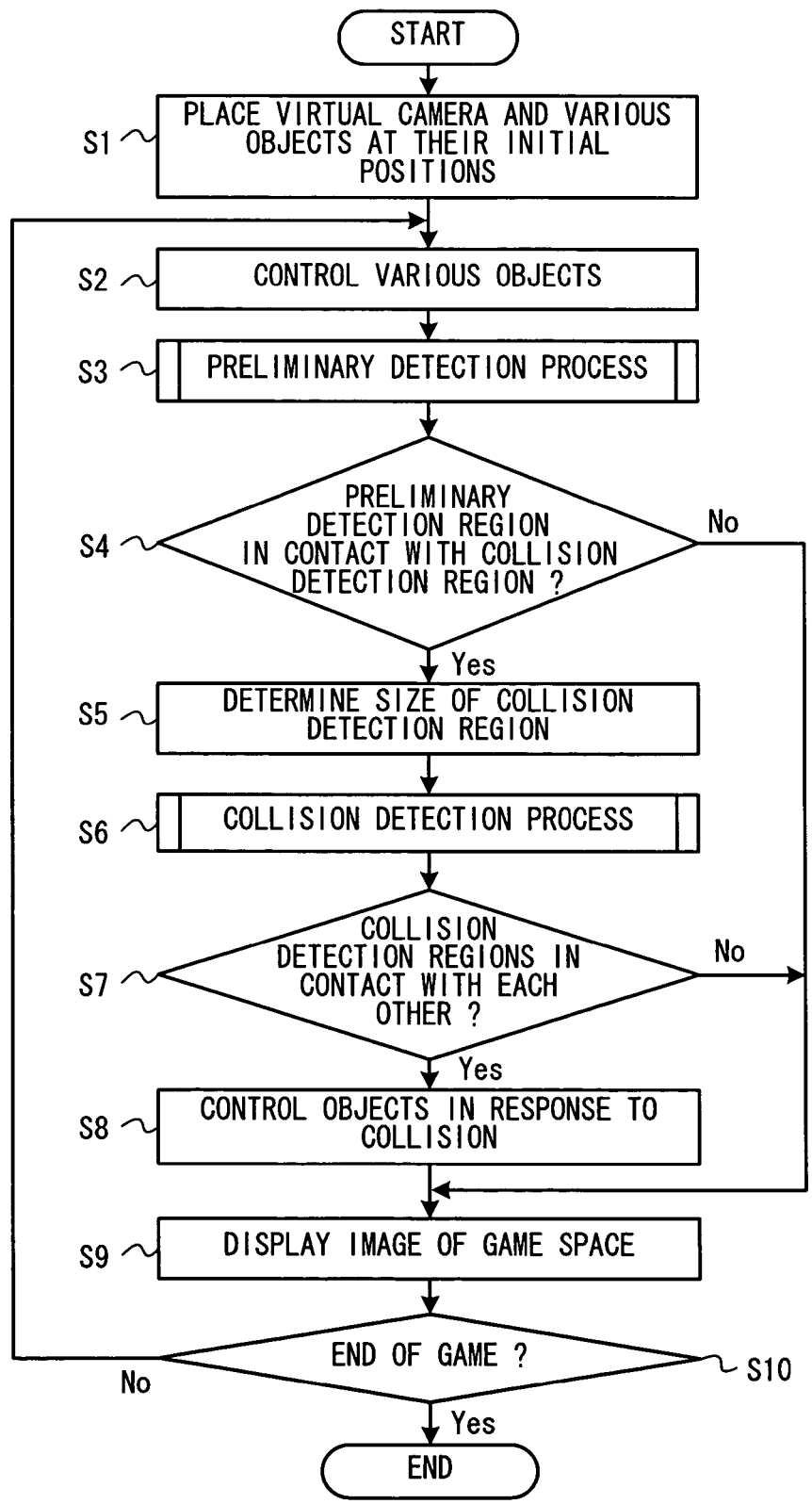
FIG. 9 is a main flow chart showing the flow of a game process performed by the video game device 3.
Figure 10:
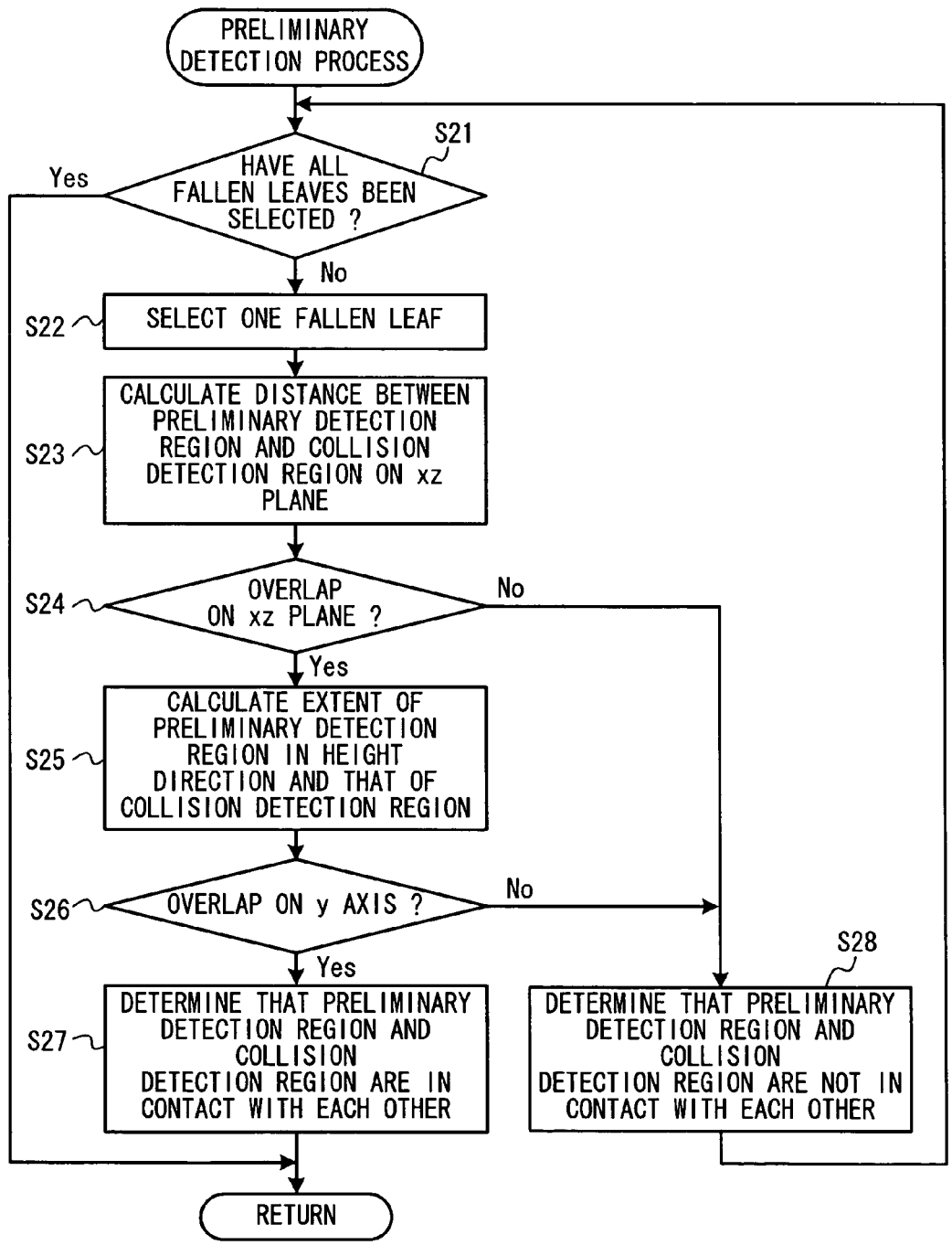
FIG. 10 is a flow chart showing the detailed flow of step S3 shown in FIG. 9.
Figure 11:
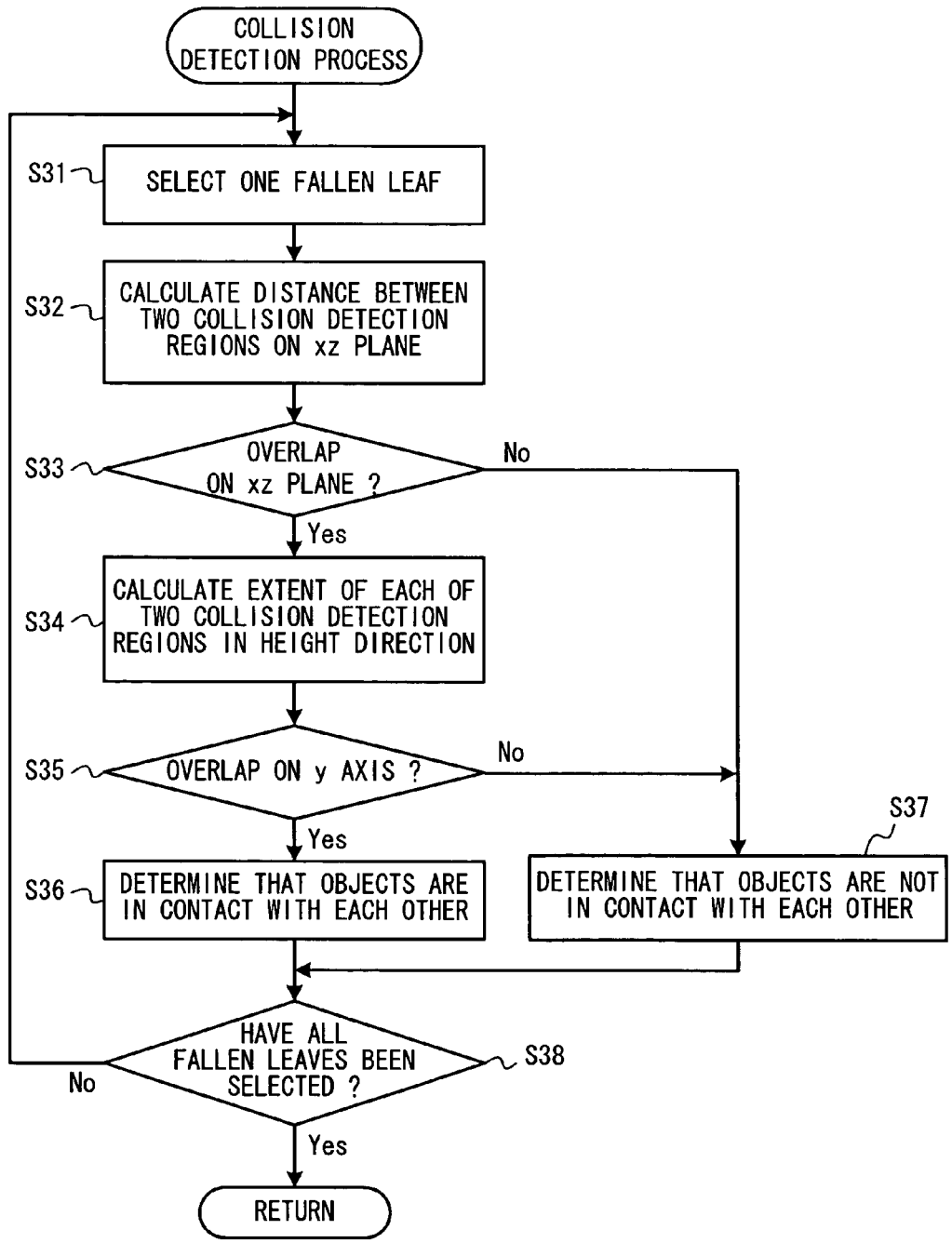
FIG. 11 is a flow chart showing the detailed flow of step S6 shown in FIG. 9.

Referring now to FIGS. 9 to 11, the details of the game process performed by the video game device 3 when executing the video game program 80 will be described. FIG. 9 is a main flow chart showing the flow of a game process performed by the video game device 3. When the power of the video game device 3 is turned ON, the CPU 31 of the video game device 3 executes a boot program stored in a boot ROM (not shown), thus initializing various units such as the work memory 32. The video game program 80 stored in the cartridge 5 is loaded to the work memory 32, and the CPU 31 starts executing the video game program 80. The flow chart of FIG. 9 shows the game process performed after the completion of the process described above. FIGS. 9 to 11 shows, in detail, portions of the game process relevant to the process of determining whether or not the first object (i.e., the tornado 72) and another object (i.e., the fallen leaf 73) have contacted each other during the game, while other portions that are not directly relevant to certain exemplary embodiments will not be described in detail. It is assumed in the game process shown in FIGS. 9 to 11 that the preliminary detection region is not defined for objects other than the first object.

In step S1, the virtual three-dimensional game space is created, while determining the initial position and direction (viewing direction) of the virtual camera for displaying a portion of the game space. Various objects are arranged in the created game space each at the initial position and in the initial orientation. Specifically, the CPU 31 stores data representing the initial position of each object as object position data in the work memory 32, and stores data representing the orientation of the object as orientation data in the work memory 32. In the present exemplary embodiment, a plurality of fallen leaf objects are arranged on the ground at the start of the game. After step S1, in the process starting from step S2, the game is played based on the player's game operations using the controller 6. The loop through steps S2 to S10 is iterated once per frame.

In step S2, various objects are controlled. For example, the player object is controlled based on the player's operation on the controller 6. Each enemy object is controlled by the CPU 31 according to a predetermined algorithm included in the video game program 80. While a tornado object is present in the game space, the tornado object is controlled by the CPU 31 according to a predetermined algorithm included in the video game program 80. As described above, a tornado object is caused by a magic boomerang thrown by the player object, for example, and the tornado object moves together with the boomerang. If the position or orientation of an object in the game space changes as a result of step S2, the CPU 31 updates the object position data included in the object data of the object (e.g., the first object data 82a) to represent the new position and the orientation data included in the object data to represent the new orientation. For example, if the position and the orientation of the first object (tornado object) change, the object position data 83a and the orientation data 84a of the first object data 82a are updated.

Then, in step S3, the preliminary detection process is performed. The preliminary detection process is a process for determining whether or not to perform a collision detection between the collision detection region of the tornado object and the collision detection region of a fallen leaf object, i.e., whether or not the preliminary detection region of the tornado object is in contact with the collision detection region of the fallen leaf object. Referring now to FIG. 10, the details of the preliminary detection process will be described.

FIG. 10 is a flow chart showing the detailed flow of step S3 shown in FIG. 9. While the preliminary detection process between a tornado object and a fallen leaf object is described with reference to FIG. 10, as an example, the preliminary detection process between other types of objects can similarly be performed as shown in FIG. 10.

First, in step S21 of the preliminary detection process, it is determined that all the fallen leaf objects lying on the ground have been selected in step S22 to be described later. If there is any unselected fallen leaf object, step S22 is performed again. Step S21 is performed so that it is possible to determine whether or not the preliminary detection has been performed for the tornado object and all the fallen leaf objects lying on the ground. The loop through steps S22 to S28 is repeated until the determination result in step S21 is true. If all the fallen leaf objects have already been selected or if there is no fallen leaves lying on the ground, the CPU 31 exits the preliminary detection process.

In step S22, the CPU 31 selects one of the fallen leaf objects lying on the ground. Step S22 is performed repeatedly as the loop through steps S21 to S28 is repeated. In step S22, the CPU 31 selects one of the fallen leaf objects lying on the ground that has not been selected. In step S22, the fallen leaves being swirled up by the tornado are not selected.

In step S23, the CPU 31 calculates the distance, on the xz plane, between the preliminary detection region defined for the tornado object and the collision detection region defined for the fallen leaf object selected in step S22. The distance calculated in this step is the distance between the center of the preliminary detection region and that of the collision detection region. Specifically, where the position of the preliminary detection region is (x1,y1,z1) and that of the collision detection region is (x2,y2,z2), the distance d can be calculated by the following expression.

$$d=((x1-x2)^2+(z1-z2)^2)^{1/2}$$

The position of the preliminary detection region herein refers to the central position of the bottom surface of the cylindrical preliminary detection region. The position of the preliminary detection region of the tornado object in the game space can be calculated based on the object position data 83*a* representing the position of the tornado object in the game space and the reference position data 86*a* representing the position at which the preliminary detection region should be defined for the tornado object. The position of the collision detection region is the central position of the bottom surface of the cylindrical collision detection region. The position of the collision detection region of the fallen leaf object in the game space can be calculated based on the object position data (e.g., the object position data 83*b*) representing the fallen leaf object in the game space and the reference position data representing the position at which the collision detection region should be defined for the fallen leaf object.

In step S24, it is determined whether or not the preliminary detection region of the tornado object and the collision detection region of the fallen leaf object selected in step S22 have an overlap therebetween on the xz plane. The determination can be made based on the distance d calculated in step S23, the radius r1 of the preliminary detection region, and the radius r2 of the collision detection region. The radius r1 is represented by the radius data 87*a* stored in the work memory 32, and the radius r2 is represented by the radius data included in the collision detection region data of the fallen leaf object stored in the work memory 32. Specifically, the CPU 31 determines whether or not the preliminary detection region and the collision detection region have an overlap therebetween on the xz plane based on the following expression.

$$r1+r2 \geq d$$

Specifically, if $r1+r2 \geq d$, it is determined that the two regions (the preliminary detection region and the collision detection region) have an overlap therebetween on the xz plane. If $r1+r2 < d$, it is determined that the two regions have no overlap therebetween on the xz plane. If it is determined in step S24 that the two regions have an overlap therebetween on the xz plane, the process proceeds to step S25. If it is determined that the two regions have no overlap therebetween on the xz plane, the process proceeds to step S28.

In step S25, the CPU 31 calculates the extent of the cylindrical preliminary detection region of the tornado object in the height direction and that of the cylindrical collision detection region of the fallen leaf object selected in step S22. The extent of the preliminary detection region is represented as a range of the y coordinate value in the world coordinate system, and can be calculated based on the height of the preliminary detection region and the position of the preliminary detection region in the game space (see step S23). For example, assume that the position of the preliminary detection region in the game space is (x3,y3,z3), and the height of the preliminary detection region is h. Then, the extent can be expressed as $y3 \leq y \leq y3+h$. As with the extent of the preliminary detection region, the extent of the collision detection region can be represented as a range of the y coordinate value in the world coordinate system, and can be calculated based on the height of the collision detection region and the position of the collision detection region in the game space (see step S23). Thus, the range of the y coordinate value is calculated for each of the two regions. Step S25 is followed by step S26.

In step S26, it is determined whether or not the preliminary detection region of the tornado object and the collision detection region of the fallen leaf object selected in step S22 have an overlap therebetween in the y-axis direction. The determination can be made based on the extent value calculated in step S25. Specifically, the CPU 31 determines whether or not the preliminary detection region and the collision detection region have an overlap therebetween in the y-axis direction based on whether or not the two extents calculated in step S25 overlap with each other. For example, where the two extents are "$1 \leq y \leq 5$" and "$4 \leq y \leq 6$", overlapping with each other, it is determined that the two regions have an overlap therebetween in the y-axis direction. Where the two extents are "$1 \leq y \leq 5$" and "$7 \leq y \leq 9$", not overlapping with each other, it is determined that the two regions have no overlap therebetween in the y-axis direction. If it is determined in step S26 that the two regions have an overlap therebetween in the y-axis direction, the process proceeds to step S27. If it is determined in step S26 that the two regions have no overlap therebetween in the y-axis direction, the process proceeds to step S28.

In step S27, it is determined that the preliminary detection region of the tornado object and the collision detection region of the fallen leaf object selected in step S22 are in contact with each other. Then, the CPU 31 updates the preliminary detection flag to indicate that there is a collision detection region being in contact with the preliminary detection region. Specifically, "1" is stored in the work memory 32 as the preliminary detection flag data 94. After step S27, the CPU 31 exits the preliminary detection process.

In step S28, it is determined that the preliminary detection region of the tornado object and the collision detection region of the fallen leaf object selected in step S22 are not in contact with each other. Then, the CPU 31 updates the preliminary detection flag to indicate that there is no collision detection region being in contact with the preliminary detection region. Specifically, "0" is stored in the work memory 32 as the preliminary detection flag data 94. After step S28, the CPU 31 performs step S21 again. The preliminary detection process is as described above.

Referring back to FIG. 9, in step S4, it is determined whether or not there is any fallen leaf object whose collision detection region is being in contact with the preliminary detection region of the tornado object. The determination can be made based on the preliminary detection flag. Specifically, the CPU 31 determines that there is a fallen leaf object being in contact with the preliminary detection region of the tornado object if the preliminary detection flag is "1", and determines that there is no fallen leaf object being in contact with the preliminary detection region of the tornado object if the preliminary detection flag is "0". If it is determined in step S4 that there is a fallen leaf object whose collision detection region is being in contact with the preliminary detection region of the tornado object, the process proceeds to step S5. If there is no fallen leaf object whose collision detection region is being in contact with the preliminary detection region of the tornado object, the process proceeds to step S9 while skipping steps S5 to S8.

In step S5, the CPU 31 determines the size of the collision detection region of the tornado object. In the present exemplary embodiment, the radius of the cylindrical collision detection region is determined in step S5, and the height of the collision detection region is predetermined. The CPU 31 randomly determines the radius using a random number within a predetermined range. The determined radius is stored in the work memory 32 as the radius data 91a. While the radius of the cylindrical region is varied in step S5 in the present exemplary embodiment, the certain exemplary embodiments are not limited thereto as long as at least the extent of the collision detection region vertical to the direction of movement of an object, for which the collision detection region is defined, is varied.

Then, in step S6, the collision detection process is performed. The collision detection process is a process for performing a collision detection between the collision detection region of the tornado object and the collision detection region of a fallen leaf object. The details of the collision detection process will now be described with reference to FIG. 11.

FIG. 11 is a flow chart showing the detailed flow of step S6 shown in FIG. 9. As with FIG. 10, the collision detection process between a tornado object and a fallen leaf object is described with reference to FIG. 11, as an example. However, the collision detection process between other types of objects can similarly be performed as shown in FIG. 11.

First, in step S31 of the collision detection process, the CPU 31 selects one of the fallen leaf objects lying on the ground. Step S31 is similar to step S22.

Then, in step S32, the CPU 31 calculates the distance between the collision detection region defined for the tornado object and the collision detection region defined for the fallen leaf object selected in step S31 on the xz plane. Step S32 is similar to step S23, except that the collision detection region of the tornado object is used instead of the preliminary detection region of the tornado object. The position of the collision detection region of the tornado object as used herein is the central position of the bottom surface of the cylindrical collision detection region. The position of the collision detection region of the tornado object in the game space can be calculated based on the object position data 83a representing the position of the tornado object in the game space, and the reference position data 90a representing the position at which the collision detection region should be defined for the tornado object.

In step S33, it is determined whether or not the collision detection region of the tornado object and the collision detection region of the fallen leaf object selected in step S31 have an overlap therebetween on the xz plane. Step S33 is similar to step S24, except that the collision detection region of the tornado object is used instead of the preliminary detection region of the tornado object. If it is determined in step S33 that the two regions have an overlap therebetween on the xz plane, the process proceeds to step S34. If it is determined that the two regions have no overlap therebetween on the xz plane, the process proceeds to step S37.

In step S34, the CPU 31 calculates the extent of the cylindrical collision detection region of the tornado object in the height direction and that of the cylindrical collision detection region of the fallen leaf object selected in step S31. Then, in step S35, it is determined whether or not the collision detection region of the tornado object and the collision detection region of the fallen leaf object selected in step S31 have an overlap therebetween in the y-axis direction. Steps S34 and S35 are similar to steps S25 and S26, except that the collision detection region is used instead of the preliminary detection region of the tornado object. If it is determined in step S35 that the two regions have an overlap therebetween in the y-axis direction, the process proceeds to step S36. If it is determined in step S35 that the two regions have no overlap therebetween in the y-axis direction, the process proceeds to step S37.

In step S36, it is determined that the two objects (the tornado object and the fallen leaf object selected in step S31) are being in contact with each other. Specifically, the CPU 31 updates the colliding object data 93a included in the first object data 82a stored in the work memory 32. More specifically, data representing the fallen leaf object selected in step S31 is added as the colliding object data 93a. Step S36 is followed by step S38.

In step S37, it is determined that the two objects (the tornado object and the fallen leaf object selected in step S31) are not being in contact with each other. Specifically, if data representing the fallen leaf object selected in step S31 is included in the colliding object data 93a, the CPU 31 deletes the data representing the object. Step S37 is followed by step S39.

Then, in step S38, it is determined whether or not all the fallen leaf objects lying on the ground have been selected in step S31. If there is any unselected fallen leaf object, step S31 is performed again. Step S38 is performed so that it is possible to determine whether or not the collision detection has been performed for the tornado object and all the fallen leaf objects lying on the ground. The loop through steps S31 to S38 is repeated until the determination result in step S38 is true. If all the fallen leaf objects have already been selected, the CPU 31 exits the collision detection process.

Referring back to FIG. 9, in step S7, following the collision detection process in step S6, it is determined whether or not the tornado object is being in contact with any of the fallen leaf objects lying on the ground. The determination can be made based on the colliding object data 93a of the first object data 82a stored in the work memory 32. Specifically, the CPU 31 determines whether or not data representing a fallen leaf object is included in the colliding object data 93a. If data representing a fallen leaf object is included in the colliding object data 93a, it is determined that the tornado object is being in contact with a fallen leaf object. If data representing a fallen leaf object is not included in the colliding object data 93a, it is determined that the tornado object is not being in contact with any fallen leaf object. If it is determined in step S7 that the tornado object is being in contact with any fallen leaf object, the process proceeds to step S8. If it is determined that the tornado object is not being in contact with any fallen leaf object, the process proceeds to step S9 while skipping step S8.

In step S8, objects are controlled in response to the collision. Specifically, fallen leaf objects in contact with the tornado object are moved as if they were being swirled up off the ground. If the position or orientation of a fallen leaf object in the game space changes as a result of step S8, the CPU 31 updates the object position data of the fallen leaf object to represent the new position and the orientation data of the fallen leaf object to represent the new orientation. In step S8, in addition to moving around the fallen leaves lying on the ground, new fallen leaf objects may be added and moved around the tornado, for example, thus increasing the number of fallen leaves to be swirling around the tornado. Thus, it is possible to exaggerate the fallen leaves being swirled up by the tornado.

In step S9, the movements of the objects in the game space are displayed on the TV 2. The CPU 31 produces a game image showing various objects, as viewed from a virtual camera, each at its new position and in its new orientation as determined in steps S2 and S8, and displays the produced game image on the TV 2. Then, in step S10, it is determined whether or not to end the game. The determination of step S10 is based on, for example, whether or not the player object's remaining physical strength has become 0 or whether or not the player object has defeated all the enemy objects. If it is determined in step S10 that the game is to be ended, the CPU 31 exits the game process shown in FIG. 9. If it is determined that the game is not to be ended, the process proceeds to step S2. Thereafter, steps S2 to S10 are repeated until it is determined in step S10 that the game is to be ended. The details of the game process are as described above.

With the game process shown in FIGS. 9 to 11 as described above, the size of the collision detection region of the tornado is varied every frame. Therefore, the range across which the fallen leaves are swirled up by the tornado varies over time. Thus, the width of the region across which the fallen leaves are blown away by the tornado is no longer constant (see the region A1 shown in FIG. 4), whereby how the fallen leaves lie after the tornado has passed can be rendered in a more realistic and more natural manner.

With the game process described above, the video game device 3 defines the preliminary detection region for the tornado. Only if the preliminary detection region contacts the collision detection region of a fallen leaf (i.e., if the determination result in step S4 is true), the CPU determines the size of the collision detection region of the tornado (step S5) and performs the collision detection process between the tornado and the fallen leaf (step S6). Therefore, if the preliminary detection region does not contact the collision detection region of the fallen leaf, steps S5 and S6 can be skipped, thus reducing the processing load on the video game device 3. In other exemplary embodiments, only steps S5 and S6 may be performed every frame without performing steps S3 and S4.

Referring now to FIGS. 12 to 16, a game process according to a variation of the certain exemplary embodiments described herein will be described. In the present variation, grass objects (also referred to simply as "grass" or "bunches of grass") lie on the ground, which are affected by a sword object (also referred to simply as a "sword") of the player object, for example.

Figure 12:
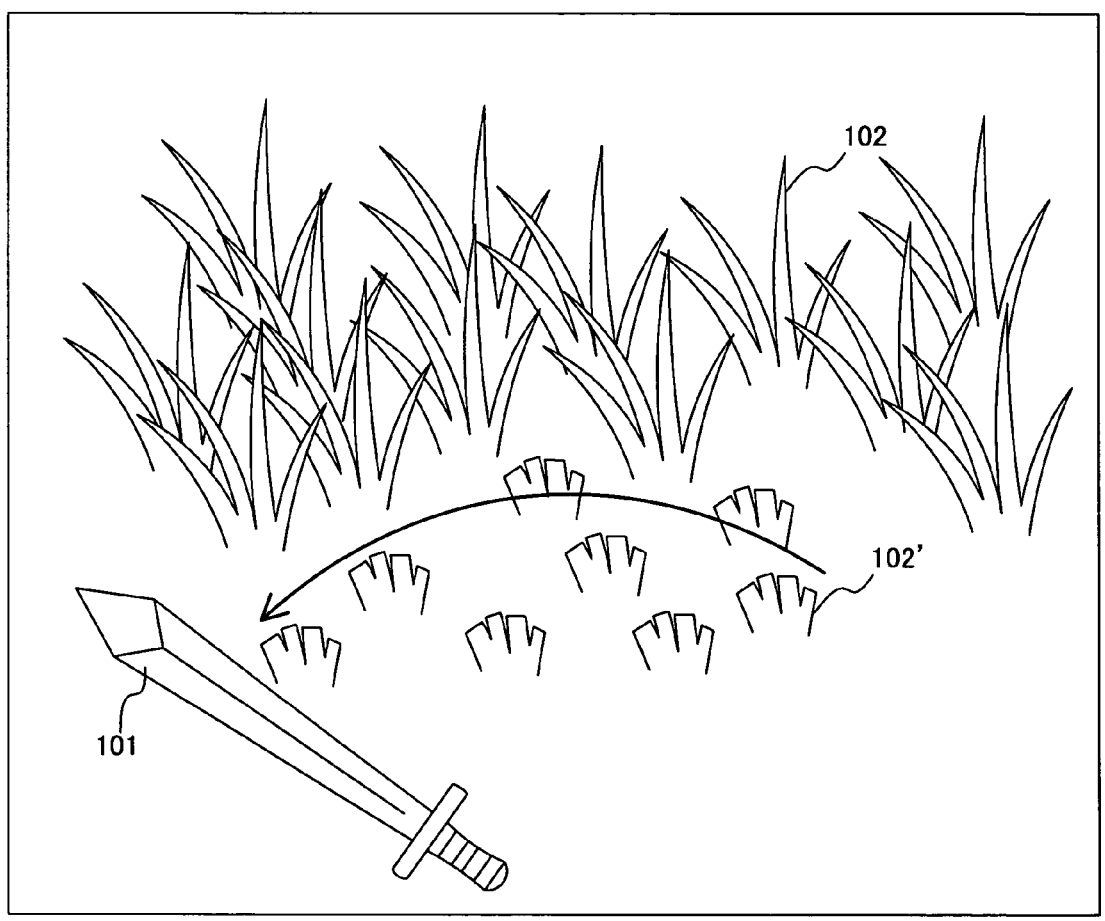
FIG. 12 shows an exemplary game screen according to a variation of a certain exemplary embodiment.

FIG. 12 shows an exemplary game screen according to the certain exemplary embodiments. The game screen of FIG. 12 shows a sword 101 held by the player object (not shown), and a plurality of bunches of grass 102 lying on the ground of the game space. Referring to FIG. 12, if the sword 101 is moved through bunches of grass as indicated by the arrow in FIG. 12, those bunches of grass are shown to have been cut off by the sword 101. In other words, if it is determined that the sword 101 contacts grass, the grass is turned from a normal grass object 102 to a stubble object 102'.

Figure 13:
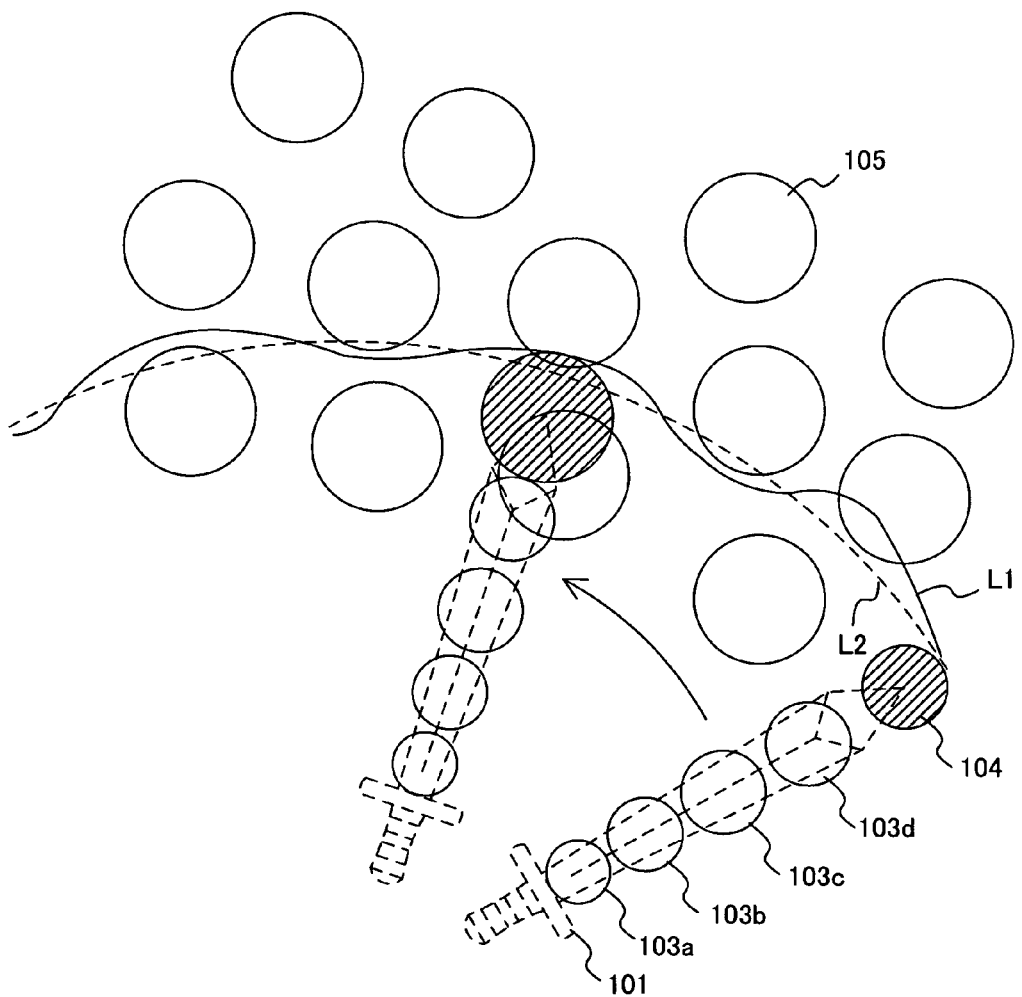
FIG. 13 shows the ground in the game space according to the variation as viewed from above.
Figure 14:
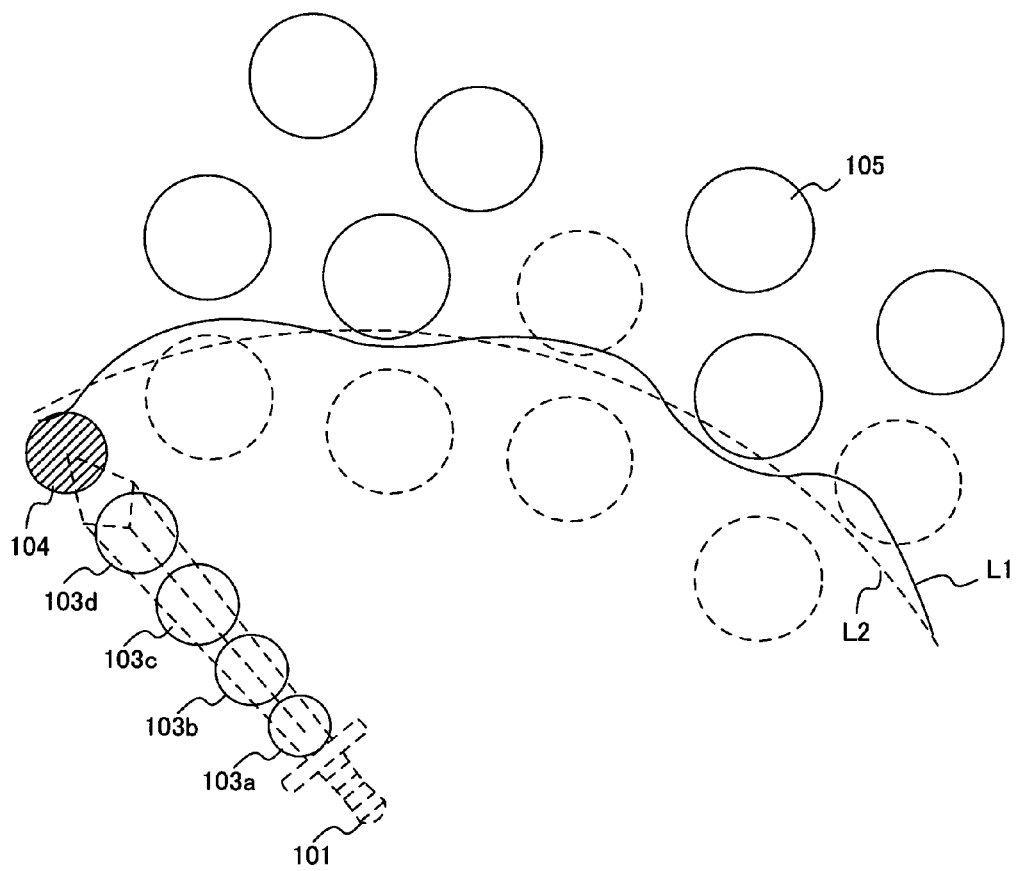
FIG. 14 shows the ground in the game space according to the variation as viewed from above.

Now, the process of cutting grass by a sword in the present variation will be outlined. FIGS. 13 and 14 show the ground in the game space as viewed from above. In FIGS. 13 and 14, the sword object 101 is represented by dotted lines and the grass objects are replaced by simplified symbols for the purpose of making the figures readily understandable. In the present variation, the collision detection region defined for each object is cylindrical, wherein the central axis thereof is vertical to the ground, as in the above exemplary embodiment. As shown in FIG. 13, there are five collision detection regions 103a to 103d and 104 defined for the sword object 101. The size (specifically, the radius of the cylinder) of the collision detection region 104 defined at the tip of the sword object 101 is varied so as to repeatedly increase and decrease. The other collision detection regions 103a to 103d each have a constant size. Thus, there may be a plurality of collision detection regions defined for one object, and some or all of the collision detection regions may have a variable size. A collision detection region 105 of a constant size is defined for each grass object. In the present variation, the preliminary detection region is not defined for the sword object or for the grass objects.

Since the size of the collision detection region 104 defined for the sword object 101 is varied over time, the periphery of the area across which the grass objects are affected by the sword object 101 being moved in the game space is as indicated by the solid line L1 in FIG. 13. Such a periphery would be as indicated by the dotted line L2 in FIG. 13 if the size of the collision detection region 104 is not varied. As is clear from the solid line L1 and the dotted line L2, the periphery takes an arc shape if the size of the collision detection region 104 is not varied, whereas the periphery does not take a regular arc shape if the size of the collision detection region 104 is varied. The collision detection regions indicated by dotted lines in FIG. 14 represent those of bunches of grass that are contacted by the collision detection region 104 as the sword object 101 is moved. Referring to FIG. 14, the remnants of the cut-off grass do not form a regular arc in the present variation, whereby the remnants of the cut-off grass can be rendered more naturally, as in the above exemplary embodiment. In the present variation, the diameter of the collision detection region of a grass object is sufficiently larger than the gap between two adjacent collision detection regions of the sword object so as to prevent the collision detection region of a grass object from passing through between the collision detection regions of the sword object. Thus, the size of the collision detection region 104 is varied over such a range that the collision detection region of a grass object becomes larger than the gap between the collision detection region 104 and the collision detection region 103d. Thus, in a case where a plurality of collision detection regions are defined for one object, the size of one of the collision detection regions whose size is varied over such a range that the gap between the collision detection region and another closest collision detection region is smaller than the size of the collision detection region of another object, which may contact the object.

Moreover, in the present variation, the effect inflicted on a grass object by the collision detection region 104 defined for the sword object 101 is varied over time. Specifically, when the collision detection region 104 of the sword object contacts the collision detection region of the grass object, the grass object is either shown to be cut off by the sword object or to be swayed by the wind pressure created by the swung sword. The effect to be inflicted on the grass by the sword object is determined randomly. This also makes the pattern of the remnants of the grass cut off by the sword irregular, whereby the remnants of the cut-off grass can be rendered more naturally.

Figure 15:
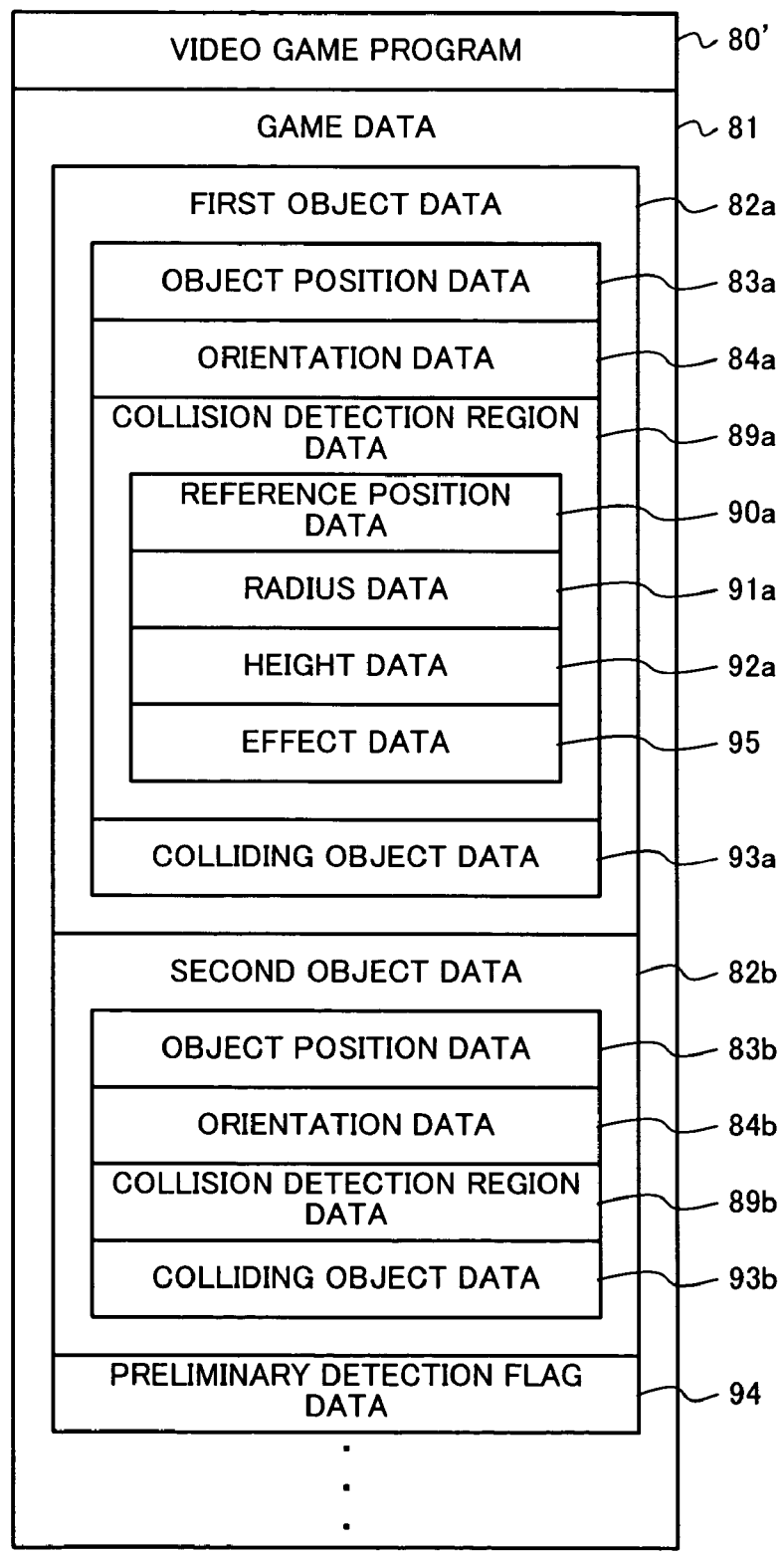
FIG. 15 shows important data stored in the work memory 32 of the video game device 3 according to the variation.

FIG. 15 shows important data stored in the work memory 32 of the video game device 3 according to the present variation. In FIG. 15, like data to those of FIG. 8 are denoted by like reference numerals and will not be further described below. The work memory 32 stores a video game program 80' and the game data 81. The video game program 80' is a video game program for instructing the video game device 3 to perform the game process (see FIG. 9) to be described later.

The present variation differs from the above exemplary embodiment in that the preliminary detection region data is not included in the first object data 82*a* and that effect data 95 is included in the collision detection region data 89*a*. Otherwise, similar data to those of the above exemplary embodiment are stored in the work memory 32. In the present variation, the first object data 82*a* is data regarding the sword object, and the second object data 82*b* is data regarding a grass object. The second object data 82*b* is data for a single grass object. Where there are a plurality of grass objects, object data similar to the second object data 82*b* is stored for each grass object.

The effect data 95 represents the effect to be inflicted on a grass object by the sword object when it is determined that the sword object contacts the grass object. Specifically, the effect data 95 may represent an effect such as "cut off" or "sway". Where the effect data 95 represents "cut off", if it is determined that the sword object contacts a grass object, the grass object is cut off. Where the effect data 95 represents "sway", if it is determined that the sword object contacts a grass object, the grass object is swayed by the wind. As described above, the effect to be inflicted on the grass object by the sword object is varied during the game, and thus the effect data 95 is updated by the CPU 31 as necessary during the game process.

Figure 16:
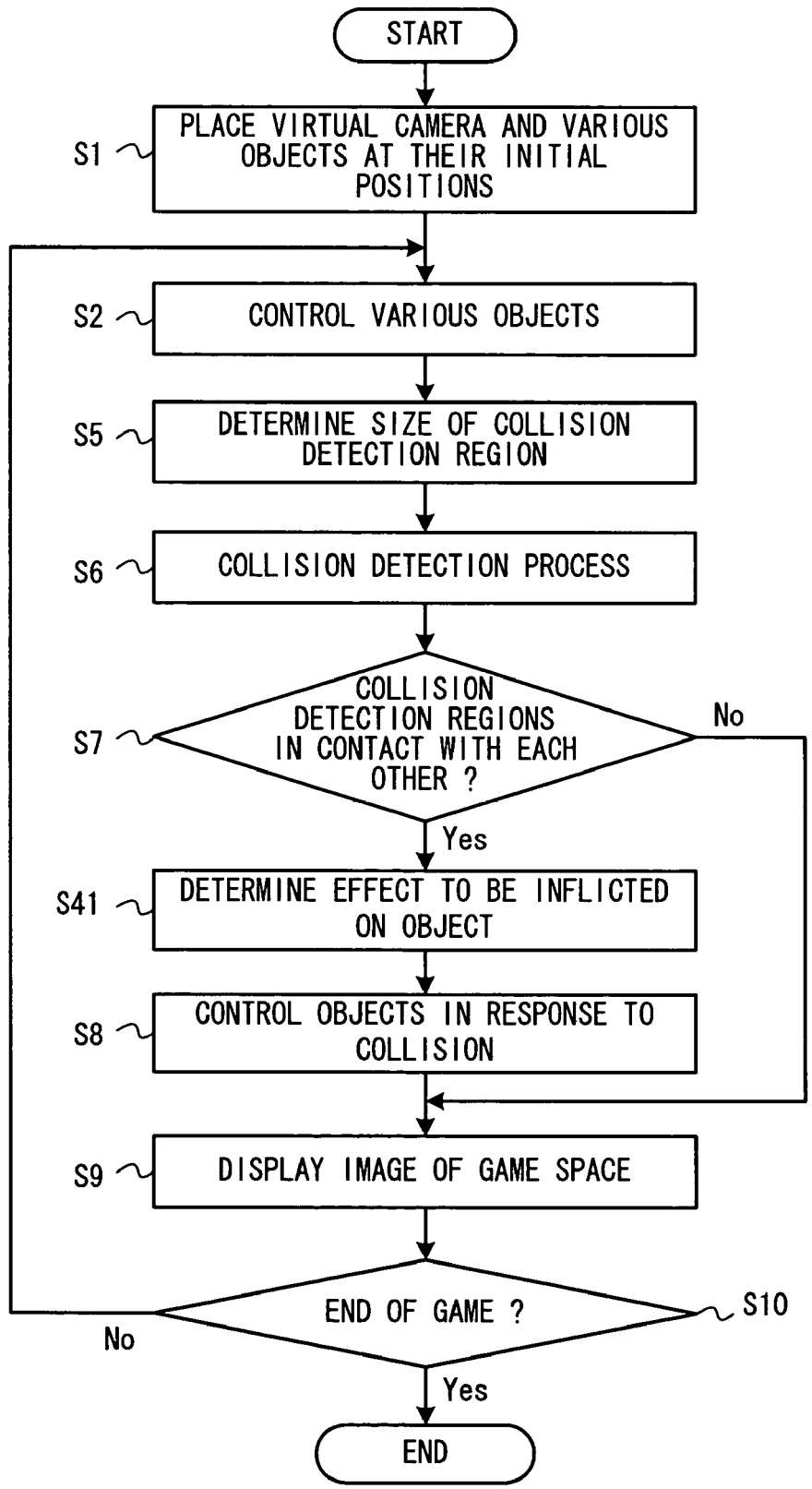
FIG. 16 is a flow chart showing the flow of a game process performed by the video game device 3 according to the variation.

FIG. 16 is a flow chart showing the flow of the game process performed by the video game device 3 according to the variation. In FIG. 16, like steps to those of FIG. 9 are denoted by like step numbers and will not be further described below.

Steps S1 and S2 are similar to those of the above exemplary embodiment. In the present variation, step S2 is followed by step S5. Steps S3 and S4 are not performed in the present variation. Steps S5 to S7 are similar to those of the above exemplary embodiment. Specifically, the size of the collision detection region of the sword object is determined randomly within a predetermined range in step S5, and it is determined in steps S6 and S7 whether or not the sword object contacts a grass object.

In the present variation, if the determination result in step S7 is true, step S41 is performed before step S8. In step S41, the CPU 31 determines the effect to be inflicted on the grass object, which has been determined to be contacted by the sword object. Specifically, the CPU 31 determines whether the grass object should be cut off or swayed by the wind. The determination is made randomly by using a prescribed random number. After the effect is determined in step S41, the effect data 95 stored in the work memory 32 is updated accordingly. Then, in step S8, grass objects determined to be contacted by the sword object are controlled in response to the collision. Thus, the effect determined in step S41 is inflicted on the grass object in step S8. Steps S9 and S10 are similar to those of the above exemplary embodiment.

In the present variation, the size of the collision detection region of the sword object is varied once per a predetermined period of time (e.g., once per frame), as described above. As a result, the periphery of the area across which the swung sword object gives an effect (i.e., the area across which the sword object contacts other objects) takes an irregular shape. Thus, the remnants of the grass cut off by the sword can be rendered more naturally.

While the size of the collision detection region is determined randomly in the above exemplary embodiment and the variation thereof, the size of the collision detection region may be varied so as to repeatedly increase and decrease. In other exemplary embodiments, the size of the collision detection region may be varied with some regularity.

The certain exemplary embodiments described herein can be used in a video game system, or the like, aiming at controlling objects so as to more naturally render an action to be executed upon collision, for example.

While the invention has been described in detail, the foregoing description is in all aspects illustrative and not restrictive. It is understood that numerous other modifications and variations can be devised without departing from the scope of the invention.

What is claimed is:

1. A computer-readable storage medium storing an image processing program to be executed by a computer of an image processing device for displaying, on a display device, a virtual three-dimensional space where there are a plurality of objects each having a collision detection region defined therefor, wherein the image processing program instructs the computer to perform:
   varying a size of the collision detection region of a predetermined object so that the size repeatedly increases and decreases over time, while the predetermined object is moving;
   determining whether or not the predetermined object is in contact with another object using the collision detection regions of the objects; and
   displaying, on the display device, a predetermined effect being inflicted on the object determined to be in contact with the predetermined object.

2. The storage medium according to claim 1, wherein:
   a preliminary detection region, different from the collision detection region, is defined for the predetermined object;
   the image processing program instructs the computer to further perform a preliminary detection by determining whether or not the collision detection region defined for the other object and the preliminary detection region are in contact with each other; and
   the varying a size of the collision detection region of a predetermined object and determining whether or not the predetermined object is in contact with another object are performed only when it is determined in the preliminary detection that the collision detection region defined for the other object and the preliminary detection region are in contact with each other.

3. The storage medium according to claim 1, wherein in the varying a size of the collision detection region of a predetermined object, the computer varies the size of the collision detection region with a predetermined time interval.

4. The storage medium according to claim 1, wherein in the varying a size of the collision detection region of a predetermined object, the computer varies the size of the collision detection region randomly within a predetermined range.

5. The storage medium according to claim 1, wherein in the displaying a predetermined effect being inflicted on the object, the computer shows a movement of the object determined to be in contact with the predetermined object to a position where the object is no longer in contact with the predetermined object, or the computer changes an appearance of the object.

6. An image processing device for displaying, on a display device, a virtual three-dimensional space where there are a plurality of objects each having a collision detection region defined therefor, comprising:
   size-varying programmed logic circuitry for varying a size of the collision detection region of a predetermined object so that the size repeatedly increases and decreases over time, while the predetermined object is moving;

a collision detector for determining whether or not the predetermined object is being in contact with another object using the collision detection regions of the objects; and a display controller for displaying, on the display device, a predetermined effect being inflicted on the object determined to be in contact with the predetermined object.

7. The image processing device according to claim 6, wherein:

a preliminary detection region, different from the collision detection region, is defined for the predetermined object;

the image processing device further includes a preliminary detector for determining whether or not the collision detection region defined for the other object and the preliminary detection region are in contact with each other;

the size-varying programmed logic circuitry performs the process of varying the size of the collision detection region only when it is determined by the preliminary detector that the collision detection region defined for the other object and the preliminary detection region are in contact with each other; and the collision detector makes the determination only when it is determined by the preliminary detector that the collision detection region defined for the other object and the preliminary detection region are in contact with each other.

8. The image processing device according to claim 6, wherein the size-varying programmed logic circuitry varies the size of the collision detection region with a predetermined time interval.

9. The image processing device according to claim 6, wherein the size-varying programmed logic circuitry varies the size of the collision detection region randomly within a predetermined range.

10. The image processing device according to claim 6, wherein the display controller shows a movement of the object determined to be in contact with the predetermined object to a position where the object is no longer in contact with the predetermined object, or the computer changes an appearance of the object.

* * * * *